(12) United States Patent
Ligtenberg et al.

(10) Patent No.: US 9,842,711 B2
(45) Date of Patent: Dec. 12, 2017

(54) KEYBOARD

(71) Applicant: Apple Inc., Cupertino, CA (US)

(72) Inventors: Christiaan A. Ligtenberg, San Carlos, CA (US); Mikael M. Silvanto, San Francisco, CA (US); Ron A. Hopkinson, Campbell, CA (US); Nicholas Alan Rundle, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/455,608

(22) Filed: Aug. 8, 2014

(65) Prior Publication Data

US 2016/0042891 A1    Feb. 11, 2016

Related U.S. Application Data

(63) Continuation of application No. PCT/US2014/050308, filed on Aug. 8, 2014.

(51) Int. Cl.
*H01H 13/86* (2006.01)
*G06F 3/02* (2006.01)
(Continued)

(52) U.S. Cl.
CPC .............. *H01H 13/86* (2013.01); *G06F 3/02* (2013.01); *H01H 13/705* (2013.01);
(Continued)

(58) Field of Classification Search
None
See application file for complete search history.

(56) References Cited

U.S. PATENT DOCUMENTS 4,005,293 A * 1/1977 Boulanger ......... H01H 13/7013
200/275
4,059,737 A 11/1977 Gergaud
(Continued)

FOREIGN PATENT DOCUMENTS

CN 2377604 Y 5/2000
CN 2490690 Y 5/2002
(Continued)

OTHER PUBLICATIONS

PCT Application No. PCT/US2014/050308—International Search Report and Written Opinion dated Apr. 13, 2015.
(Continued)

*Primary Examiner* — Mohamed Barakat
(74) *Attorney, Agent, or Firm* — Downey Brand LLP

(57) ABSTRACT

Embodiments of keyboards having variations of electrically connecting keys to an internal component of an electronic device are described. Some embodiments include positioning several rows of conductive layers below several rows of keys. The conductive layers may be configured to receive a signal indicating a key has been depressed. Also, the internal component may be configured to scan the conductive layers to determine whether a key or keys have been depressed. In some embodiments, the conductive layers lie outside a portion of the electronic device in which internal components are traditionally located. In some embodiments, a substrate may be integrally connected with the keyboard. The substrate may receive some internal components of the electronic device.

18 Claims, 22 Drawing Sheets

(51) Int. Cl.
*H01H 13/705* (2006.01)
*H01H 13/79* (2006.01)
*G06F 1/16* (2006.01)
*H01H 13/702* (2006.01)
*H01H 11/00* (2006.01)
*H01H 13/785* (2006.01)
*H01H 13/83* (2006.01)
*H01H 13/88* (2006.01)

(52) U.S. Cl.
CPC .......... *G06F 1/1616* (2013.01); *G06F 1/1656* (2013.01); *G06F 1/1662* (2013.01); *H01H 11/00* (2013.01); *H01H 13/702* (2013.01); *H01H 13/785* (2013.01); *H01H 13/79* (2013.01); *H01H 13/83* (2013.01); *H01H 13/88* (2013.01); *H01H 2223/036* (2013.01); *H01H 2223/04* (2013.01); *H01H 2231/002* (2013.01)

(56) References Cited

U.S. PATENT DOCUMENTS

| | | | |
|---|---|---|---|
| 4,326,195 | A | 4/1982 | Seki et al. |
| 5,898,567 | A | 4/1999 | Satake |
| 2002/0135457 | A1* | 9/2002 | Sandbach ............... G06F 3/023 338/47 |
| 2003/0198007 | A1 | 10/2003 | Wulff et al. |
| 2004/0016628 | A1 | 1/2004 | Hochgesang et al. |
| 2006/0165465 | A1 | 7/2006 | Wu |
| 2009/0128509 | A1* | 5/2009 | Kohtz ................... G06F 1/1626 345/173 |
| 2010/0091442 | A1 | 4/2010 | Theobald et al. |
| 2010/0271310 | A1* | 10/2010 | Olodort ................. G06F 1/1613 345/169 |
| 2010/0272490 | A1* | 10/2010 | Chang ................... G06F 3/0202 400/490 |
| 2011/0169743 | A1* | 7/2011 | Oh .......................... H04M 1/22 345/169 |
| 2013/0328741 | A1* | 12/2013 | Degner ................. G06F 1/1658 343/841 |
| 2014/0218890 | A1 | 8/2014 | Wang |

FOREIGN PATENT DOCUMENTS

| | | |
|---|---|---|
| CN | 2630932 Y | 8/2004 |
| CN | 1550958 A | 12/2004 |
| CN | 201348960 Y | 11/2009 |
| CN | 203689454 U | 7/2014 |
| EP | 2346232 A2 | 7/2011 |
| JP | S56-002037 A | 1/1981 |
| JP | S60-076434 U | 4/1985 |
| JP | H1-160533 A | 6/1989 |
| JP | H2-032143 U | 2/1990 |
| WO | 2010045161 | 4/2010 |

OTHER PUBLICATIONS

European Patent Application No. 15179525.9—Extended European Search Report dated Nov. 17, 2015.
Chinese Patent for Utility Model No. ZL201520594926.8—Utility Model Patentability Evaluation Report (UMPER) dated Jan. 25, 2016.
Chinese Application for Invention No. 201510479098.8—Office Action dated Jan. 23, 2017.
European Patent Application No. 15179525.9—Examination Report dated Dec. 23, 2016.
Taiwanese Patent Application No. 104124993—Office Action dated May 17, 2017.
European Patent Application No. 15179525.9—Summons to Oral Proceedings dated Sep. 25, 2017.
Chinese Application for Invention No. 201510479098.8—Second Office Action dated Aug. 15, 2017.
Japanese Utility Model Application No. 2017-600023—Technical Evaluation Oct. 13, 2017.

* cited by examiner

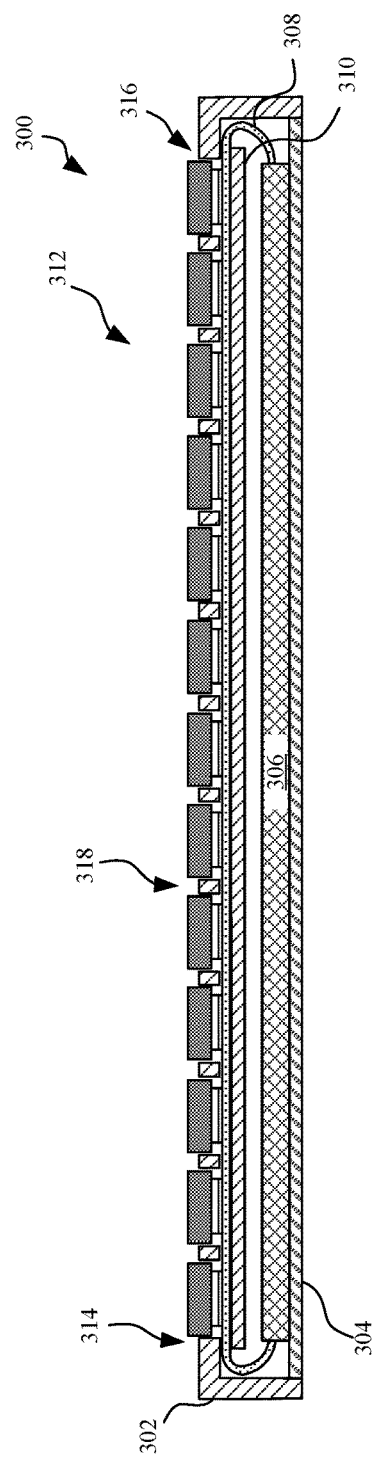
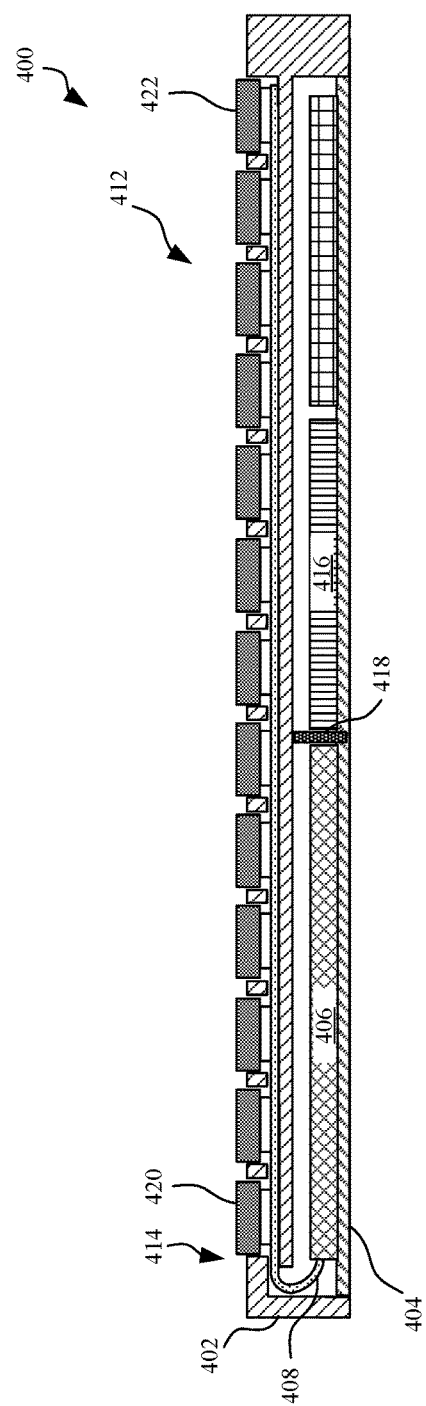
FIG. 8
FIG. 9

KEYBOARD

CROSS-REFERENCE TO RELATED APPLICATIONS

This is a continuation of International Application PCT/US14/50308, with an international filing date of Aug. 8, 2014, entitled "KEYBOARD", published as WO 2016/022145 on Feb. 11, 2016, which is incorporated herein by reference in its entirety.

FIELD

The described embodiments relate generally to a keyboard of an electronic device. In particular, the present embodiments relate to a keyboard having individual keys electrically connected in rows to an internal component of the electronic device.

BACKGROUND

Keyboards are generally known in the art for allowing a user input to an electronic device. Keyboards include several keys positioned within several indentations or openings within a top portion of the keyboard. The keys may be electrically connected to a substrate (e.g., printed circuit board) located within the electronic device. The substrate generally includes dimensions (e.g., length and width) similar to that of the keyboard. In other words, at least a portion of the substrate is positioned below each key. The substrate may include several switches or other components such that when a key is depressed, one of the switches or other components is actuated. This actuation may correspond to the user input to the electronic device.

However, keyboards using substrates in this manner have several disadvantages. For example, a substrate having similar dimensions to that of the keyboard uses a large portion of limited space within the keyboard. This reduces the amount of space available for other components, and in addition, may create difficulties in reducing the overall footprint of the keyboard. Also, in order for the substrate to receive the user input, each indentation that receives a key must include an opening such that one or more components (e.g., keycap, switch) may protrude through the opening and connect to the substrate. These openings allow for ingress of contaminants (e.g., dust, liquids) to propagate to various components within the keyboard and/or the electronic device, which may result in damage to or failure of the electronic device. Also, the openings necessarily result in removal of material from the keyboard causing a reduction in the overall rigidity of the keyboard. Accordingly, the keyboard may appear less sturdy to a user.

The substrate also occupies an area that could otherwise be used to receive other internal components, such as an interior portion of the keyboard located on a portion opposite the indentations. As a result, some internal components that generate heat within the electronic device are in close proximity to other internal components vulnerable to heat.

SUMMARY

In one aspect, a keyboard for performing a user input to an electronic device is described. The keyboard may include a substrate having a top portion and a rear portion opposite the first portion, the top portion including a first indentation and a second indentation. The keyboard may further include a rib positioned between the first indentation and the second indentation. The keyboard may further include a conductive layer providing an electrical pathway to the first indentation and the second indentation. In some embodiments, a portion of the conductive layer is positioned within the first indentation and the second indentation.

In another aspect, an electronic device is described. The electronic device may include a top case having a keyboard. The keyboard may include a first row of indentations having a first conductive layer extending along the first row of indentations. The keyboard may further include a second row of indentations having a second conductive layer extending along the second row of indentations. In some embodiments, the first conductive layer and the second conductive layer are electrically connected to an internal component in the electronic device. In some embodiments, a bottom case is engaged with the top case.

In another aspect, a method for forming a top case of an electronic device, the top case formed from an aluminum substrate, is described. The method may include removing a first portion of the aluminum substrate to define several indentations for a keyboard and an opening for a touch pad, the several indentations including a first row of indentations having a first indentation and a second indentation. The method may further include removing a second portion of the aluminum substrate to define a lip portion extending around an outer peripheral portion of the aluminum substrate. The method may further include removing a third portion of the aluminum substrate to define a conduit below a rib positioned between the first indentation and the second indentation.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIGS. 8 and 9 illustrates a cross sectional side view of an embodiment of an electronic device having a conductive layer extending through openings of a keyboard;

FIG. 9 illustrates a cross sectional side view of an alternate embodiment of an electronic device having a conductive layer extending through one opening of a keyboard;

Figure 1:
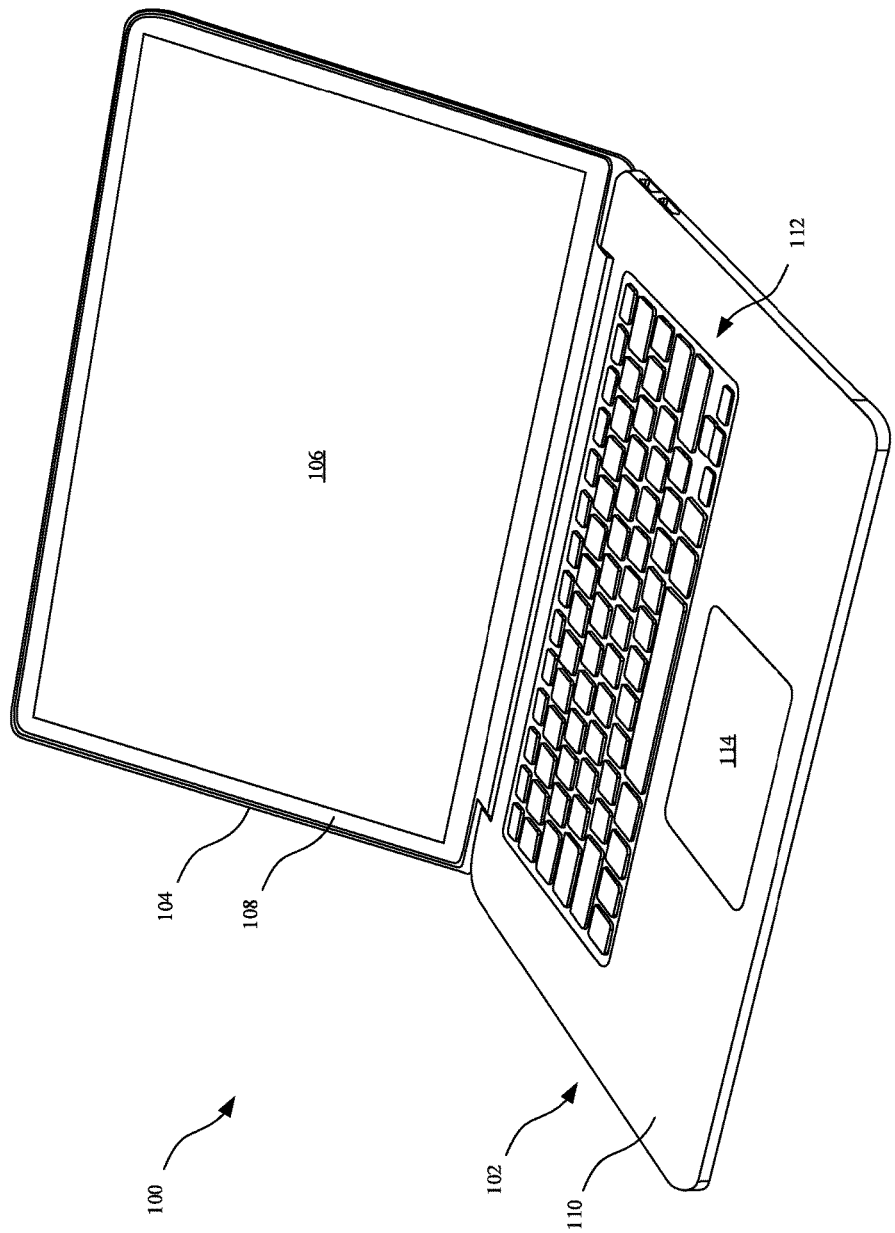
FIG. 1 illustrates an isometric view of an electronic device in an open configuration.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an electronic device having a keyboard with conductive layers integrated with the keyboard. These conductive layers may a printed circuit board ("PCB") or a flexible layer having an electrically conductive material or materials configured to electrically connect the keys of the keyboard to an internal component of the electronic device. The conductive layers may be positioned within the indentations, or keyholes, used to receive the keys. The keyboard may include ribs positioned between adjacent indentations. Some of the ribs include an "underpass" or conduit machined in the lower portion of the ribs thereby allowing the conductive layers to extend along a row of indentations. Each conductive layer is configured to receive a user input generated by depressing one or more keys in the row corresponding to the conductive layer. Also, each conductive layer is configured to provide electric current to each key which may be used for a light source (e.g., light-emitting diode, or LED) positioned within individual indentations and/or to power a switch or other component that is actuated when a key is pressed. These conductive layers are electrically connected to at least one internal component within the electronic device. For example, the conductive layers may be electrically connected to a processor or main logic board, either of which may be configured to convert the user input to a predetermined function (e.g., pressing a key with a "1" label on the key generates a "1" being displayed on a display panel of the electronic device). Also, the internal component may use the conductive layer to scan the row of keys electrically connected to the conductive layer to determine whether a key is depressed.

In some embodiments, the indentations do not include any apertures or openings, but may open to a conduit described above. As such, the conductive layers pass through the indentations and the conduits, thereby creating minimal exposure of internal components of the electronic device to ingress of contaminants. The keyboard may include openings at lateral portions of the keyboard allowing the conductive layers to pass through the openings and electrically connect to an internal component. However, these openings are generally positioned in a manner that provides significantly less access to internal components in the electronic device. Also, the aggregate amount of materials used to form the conductive layers may be substantially less than that of a traditional printed circuit board. This allows for additional space within the electronic device (for example, in an area below the keyboard). Alternatively, this may allow for electronic devices having an overall reduced size.

While the keyboard configuration described above does not include apertures in the indentations, other embodiments of a keyboard may include apertures located on a vertical sidewall or surface of the indentation. In this manner, a conductive layer may include an extension for each key associated with the conductive layer. The extensions are configured to pass through the apertures and electrically connected keys within the apertures to an internal component. While the extensions may be visible in the indentation to connect to the keys, a lengthwise portion of the conductive layer is positioned within the keyboard (i.e., not visible) above or below the indentations.

In some embodiments, the keyboard includes indentations having apertures proximate to the ribs such that a conductive layer extends along the indentations and conduits in the ribs in a weave pattern. However, a rear portion defining a surface on which the conductive layers are positioned does not include any apertures. Thus, the internal components are again shielded from contaminants.

Also, in some embodiments, the keyboard may include a rear portion with a first surface defining a lower portion of the indentations, and a second surface opposite the first surface configured to integrally receive a substrate that receives an internal component (e.g., fan). The internal component may be coupled to a conductive layer used to electrically connect the keys to an internal component of the electronic device.

These and other embodiments are discussed below with reference to FIGS. 1-34. However, those skilled in the art will readily appreciate that the detailed description given herein with respect to these Figures is for explanatory purposes only and should not be construed as limiting.

FIG. 1 illustrates an isometric view of electronic device 100 in an open configuration. In some embodiments, electronic device 100 is a portable electronic device such as a MacBook®, made by Apple, Inc., from Cupertino, Calif. Electronic device 100 includes base portion 102 pivotably connected to a lid 104. Lid 104 may be formed having uni-body construction configured to provide additional strength and resiliency which is particularly important due to the stresses caused by repeated opening and closing occurring during normal use. In addition to the increased strength and resiliency, the uni-body construction of lid 104 can reduce an overall part count by eliminating separate support features, which may decrease manufacturing cost and/or complexity.

Display 106 may be coupled to lid 104 such that display 106 is provided with structural support. Lid 104 may include display trim 108 that surrounds display 106. Display trim 108 can be formed of an opaque material such as ink deposited on top of or within a protective layer of display 106. Thus, display trim 108 can enhance the overall appearance of display 106 by hiding operational and structural components as well as focusing attention onto the active area of the display.

Display 106 can display visual content such as a graphical user interface, still images such as photos as well as video media items such as movies. Display 106 can display images using any appropriate technology such as a liquid crystal display (LCD), a light emitting diode (LED) display, an organic light emitting diode (OLED) display, etc.

Figure 2:
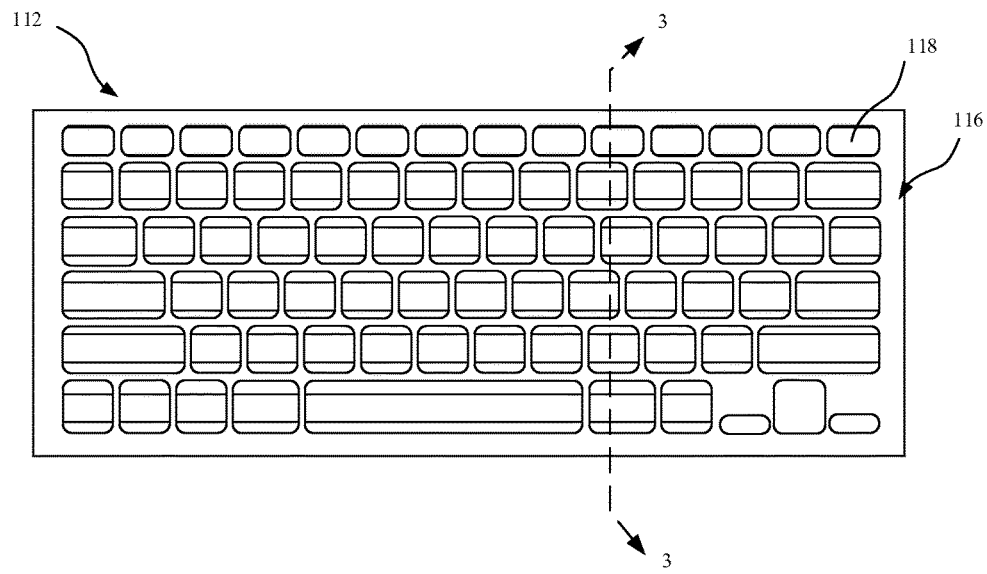
FIG. 2 illustrates a top view of an embodiment of a keyboard with the keyboard keys of the keyboard removed, showing conductive layers extending through the indentations.

Base 102 may include top case 110. As illustrated in FIG. 2, top case 110 is configured to accommodate various user input devices such as a keyboard 112 and a touchpad 114. In particular, these user input devices may be exposed such that a user may interact with the input devices when electronic device 100 is positioned in the open configuration.

Further, base 102 may include a bottom case (not shown). The bottom case along with top case 110 may cooperate to receive various other electronic and mechanical components. In some embodiments, base 102, top case 110 and bottom case are made from a metallic material (for example, aluminum). Also, in some cases, top case 110 is formed from single aluminum substrate and machine to remove material in a desired manner.

As may be understood, by way of example, the electronic components may include a mass storage device (e.g., a hard drive or a solid state storage device such as a flash memory device including non-transitory and tangible memory that may be, for example, volatile and/or non-volatile memory) configured to store information, data, files, applications, instructions or the like, a processor (e.g., a microprocessor or controller) configured to control the overall operation of the portable electronic device, a communication interface configured for transmitting and receiving data through, for example, a wired or wireless network such as a local area network (LAN), a metropolitan area network (MAN), and/or a wide area network (WAN), for example, the Internet, a fan, a heat pipe, and one or more batteries.

FIG. 2 illustrates a top view of an embodiment of keyboard 112 with the keyboard keys of keyboard 112 removed. Conductive layers 116 extend along rows in areas below which the keys of keyboard 112 are received. In some embodiments, conductive layers 116 are formed from PCB. In the embodiment shown in FIG. 2, conductive layers 116 are formed from a flexible material further including an electrically conductive material (or materials). However, the electrically conductive material or materials may be surrounded by an insulated material (e.g., EMI shield) such that conductive layers 116 are not electrically connected to component such as keyboard 112. When the keyboard keys are installed, conductive layers 116 are configured to electrically connect each key in the row to an internal component (e.g., processor, main logic board, internal power supply) of the electronic device. This allows conductive layers 116 to receive a user input (e.g., pressing a key) from any key and relay the user input to the internal component. Also, conductive layers 116 may be configured to provide electrical current to each key in order to, for example, power a light source (e.g., LED) positioned below each key and/or power a switch used to generate the user input previously described. For example, first conductive layer 118 is configured to electrically connect the uppermost row of keys (when the keys are installed) to an internal component.

Figure 3:
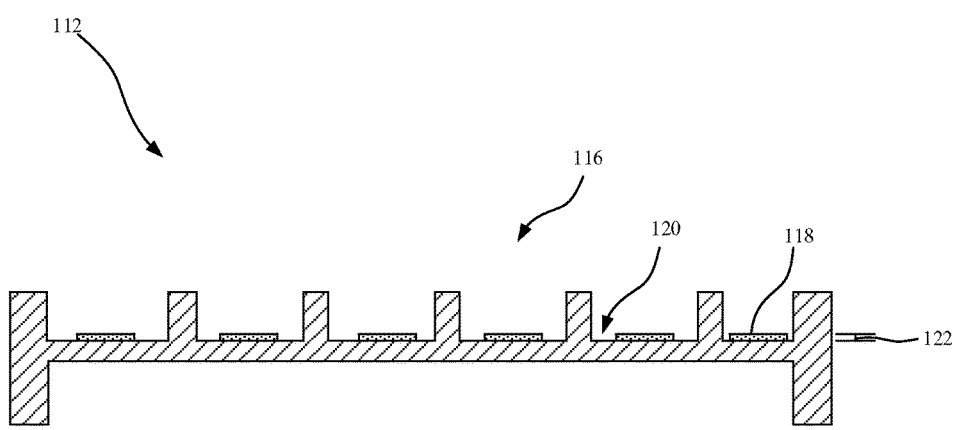
FIG. 3 illustrates a cross-sectional view of the keyboard along the line 3-3 shown in FIG. 2, illustrating the conductive layers positioned on rear portion of the keyboard.

FIG. 3 illustrates a cross-sectional view of keyboard 112 along the line 3-3 shown in FIG. 2, illustrating conductive layers 116 positioned on rear portion 120 of keyboard 112. Rear portion 120 is generally associated with a surface on which conductive layers 116 are positioned. Alternatively, rear portion 120 may be referred to as a portion remaining after removal process removes material to form a location that receives the keys (not shown). In some embodiments, conductive layers 116 are adhesively attached to rear portion 120. Also, in some embodiments, rear portion 120 includes an aperture in order to receive a component (e.g., switch, LED) electrically connected to an internal component. In the embodiment shown in FIG. 3, rear portion 120 does not include any apertures, as conductive layers 116 are capable of receiving the components and transmitting electrical signals from the keys to an internal component. Electric signals may include a data signal or signals notifying an internal component (not shown) electrically connected to conductive layer 116 that at least one key electrically connected to conductive layer 116 is depressed. FIG. 3 also shows conductive layers 116 having a thickness. For example, first conductive layer 118 includes thickness 122 approximately in the range of 0.08 to 0.2 mm. Conductive layers 116 positioned on rear portion 120 may replace a traditional PCBs (traditionally positioned below rear portion 120) used to electrically connect the keys to an internal component of an electronic device. In this manner, additional internal components may occupy the space previously occupied by the PCB. Alternatively, the electronic device may be made smaller or more compact.

Figure 4:
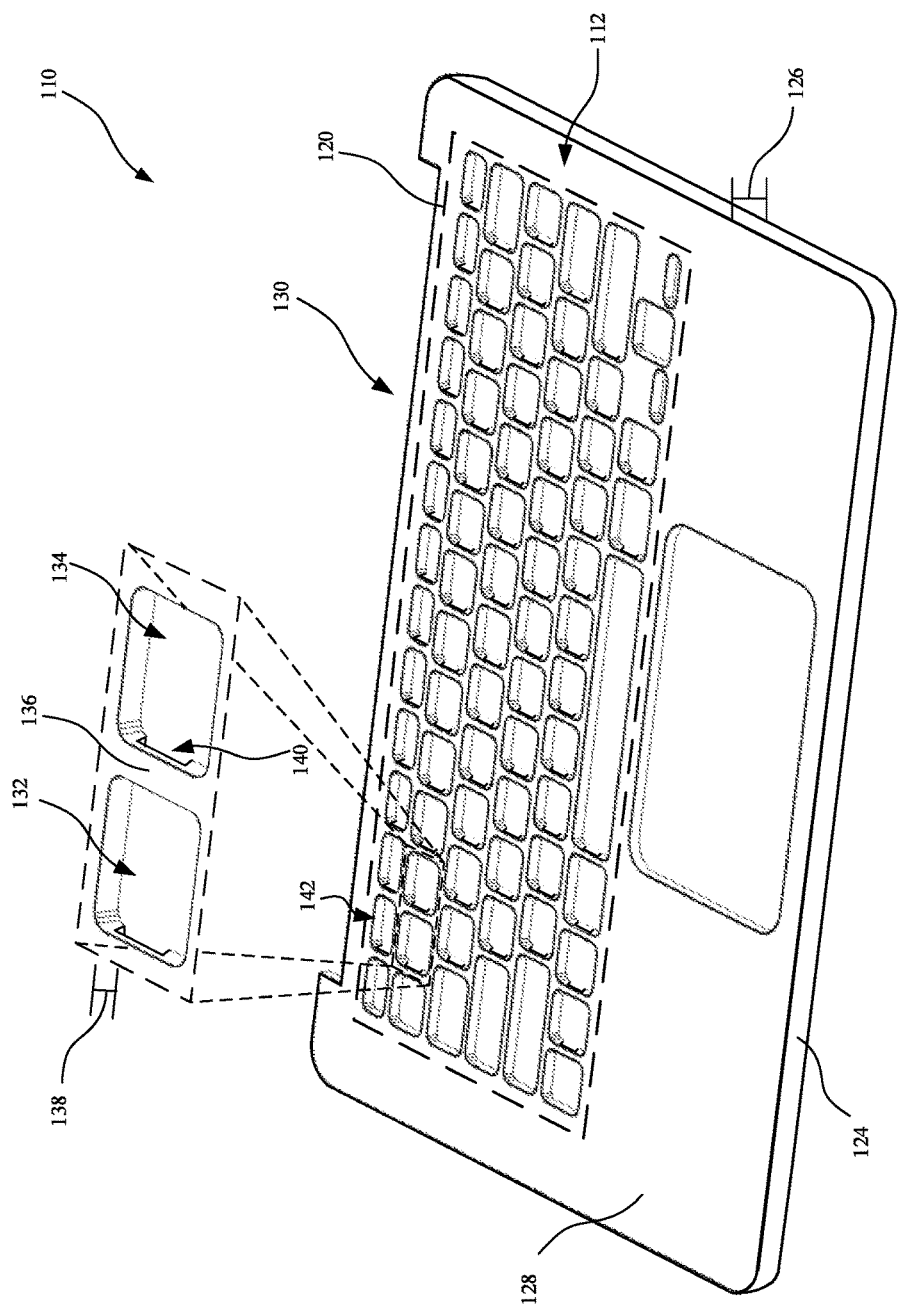
FIG. 4 illustrates an isometric view of an embodiment of the top case (shown in FIG. 1)

FIG. 4 illustrates an isometric view of an embodiment of top case 110 (shown in FIG. 1) having lip portion 124 extending around an outer peripheral portion of top case 110. In some embodiments, lip portion 124 is prefabricated and subsequently connected top case 110 by, for example, welding, soldering, and/or adhesives. In the embodiment shown in FIG. 2, top case 110 is unitary body with material removed from a lower portion (not shown) of top case 110 to define lip portion 124 as shown. Removal means may include machining or cutting by an end mill or a computer numerical control ("CNC") cutting tool. It will be appreciated that removal means may include any tool known in the art for removing material from a metallic substrate. Also, lip portion 124 includes lip height 126 extending vertically from a top portion 128 of top case 110 to a lower edge of lip portion.

Top case 110 further includes indentations 130 that define areas in which individual keys may be positioned. Indentations 130 may be formed by removing material from top case 110 in any manner previously described for removing material to form lip portion 124. Also, several ribs are positioned between adjacent indentations. Further, some of the ribs may include conduits (or underpasses) formed at lower portions of the ribs. These conduits may be formed by a cutting tool (e.g., a T-shaped cutting tool or "T-cutter") or alternatively, by removal means previously described. The enlarged view in FIG. 4 shows exemplary first indentation 132 and second indentation 134 adjacent to first indentation 132. Also, first indentation 132 includes a depth 138 extending from top portion 128 of top case 110 to rear portion 120 of keyboard 112. Top case 110 is machined or fabricated such that depth 138 is less than lip height 126 of lip portion 124. This may create space between bottom portion 120 and a bottom case (not shown) engaged with lip portion 124 such that several internal components may be positioned between rear portion 120 and the bottom case. Also, first rib 136 is positioned between first indentation 132 and second indentation 134. First rib 136 includes first conduit 140 in a lower portion of first rib. The conduits in FIG. 4 are configured to open into adjacent indentations such that a conductive layer (e.g., one of the conductive layers 116 in FIGS. 2 and 3) passes through the indentations and the conduit. Also, as shown in FIG. 4, first conduit 140 is generally rectangular. However, first conduit 140 may include any shape corresponding to the shape of conductive layers 116 (shown in FIGS. 2 and 3) in order to receive conductive layers 116. Also, the conduits shown in FIG. 4 are generally similar in shape and size. However, the size and shape of the conduits could vary in order to accommodate the dimension of the indentations. For example, third indentation 142 includes at least a dimension less than that of first indentation 132. Accordingly, a smaller conductive layer and correspondingly conduit may be necessary.

Figure 5:
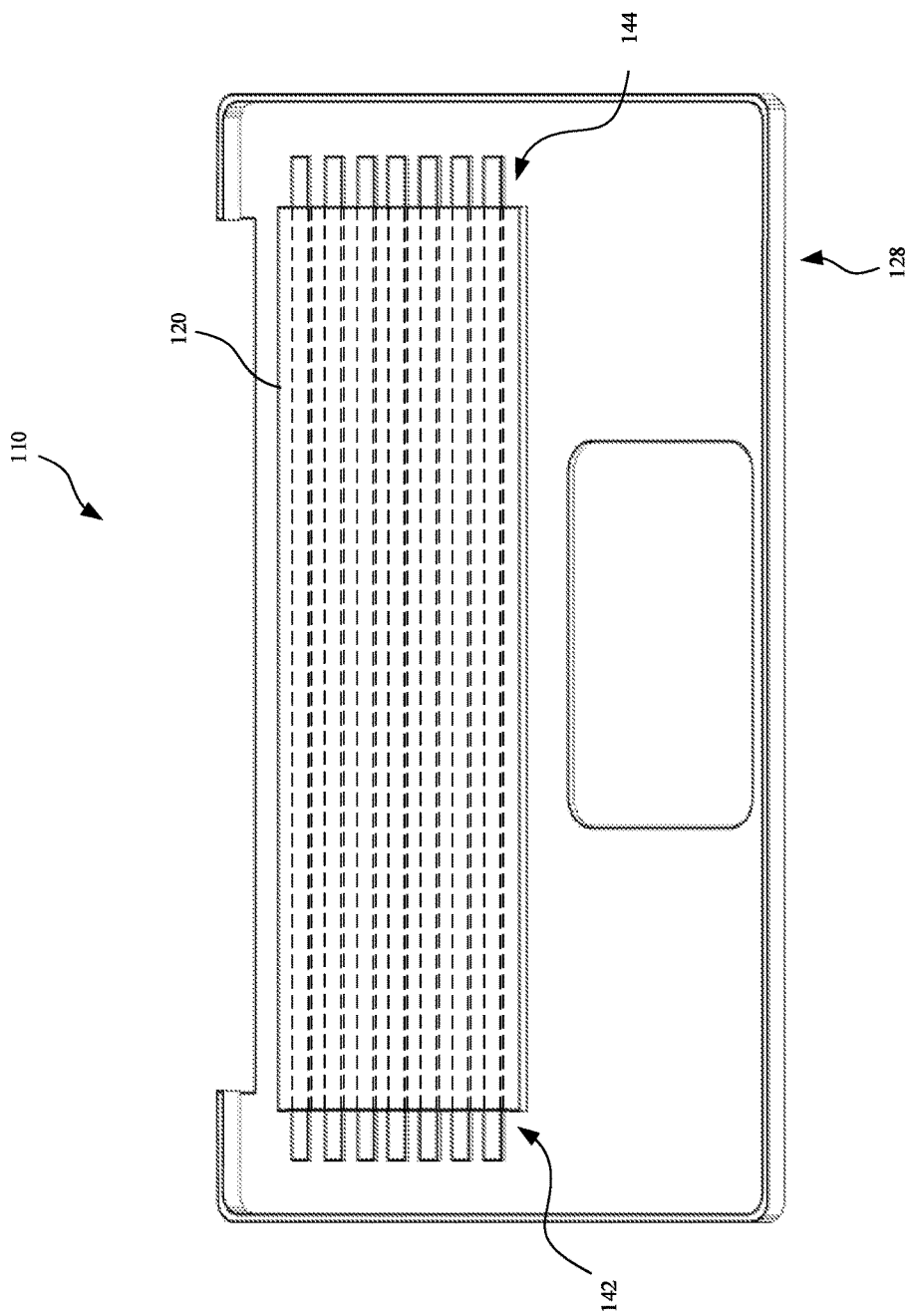
FIG. 5 illustrates an isometric view of top the case shown in FIG. 4, rotated to show in an internal portion of top case.

FIG. 5 illustrates an isometric view of top case 110 shown in FIG. 4, rotated to show in an internal portion of top case 110. As previously discussed, top case 110 is a unitary structure having material removal by a tool previously described. Conductive layers 116 may be inserted between rear portion 120 and the ribs (shown in FIG. 4). Conductive layers 116 further extend through openings 142 and 144 formed between rear portion 120 and top portion 128. It should be noted that rear portion 120 does not include any openings or apertures in areas directly adjacent to the indentations (shown in FIG. 4) other than openings 142 and 144. Rather, the keys may be electrically connected to internal components via (e.g., processor, internal power supply) conductive layers 116.

Figure 6:
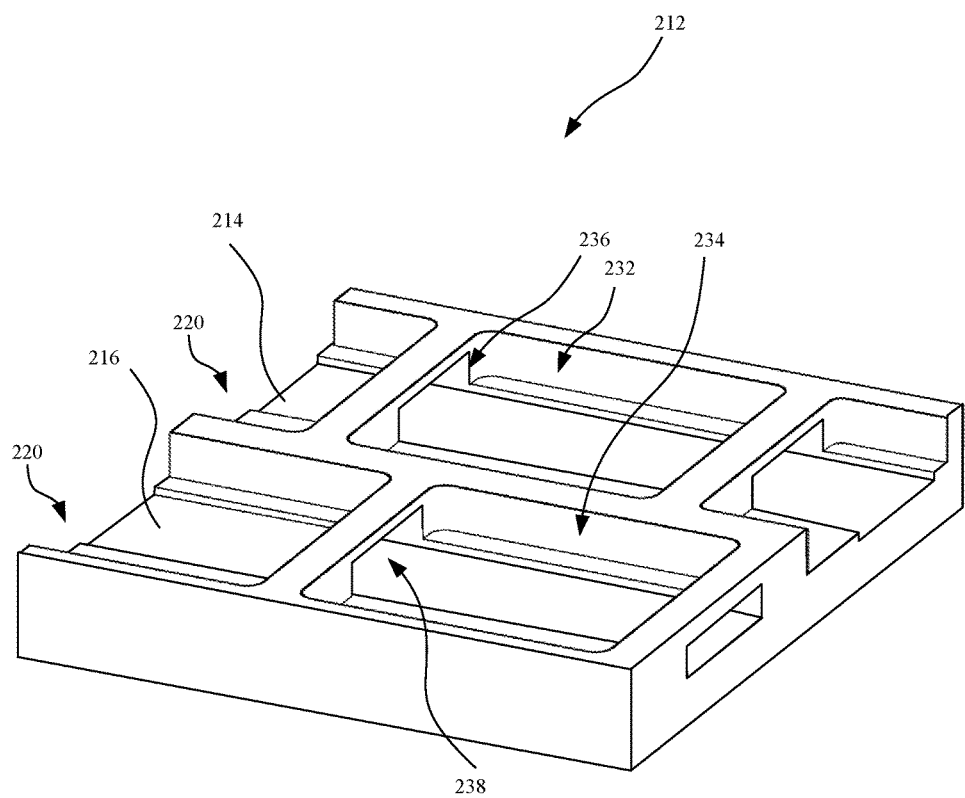
FIG. 6 illustrates an enlarged portion of an alternate embodiment of a keyboard having grooves extending along the indentations.

FIG. 6 illustrates an enlarged area of an alternate embodiment of keyboard 212 having grooves extending along rear portion 220 of keyboard. For example, first groove 214 extends through first indentation 232 and first conduit 236, and second groove 216 extends through second indentation 234 and second conduit 238. First groove 214 and second groove 216 are configured to receive a conductive layer previously described. These grooves may be used, for example, to create additional space in the indentations which receive the keys of keyboard 212. Also, although first groove 214 and second groove 216 are shown in FIG. 6 having a rectangular dimension, first groove 214 and/or second groove 216 may include any dimension corresponding to the conductive layer in order to receive the conductive layer. It should be understood that FIG. 6 represents an exemplary portion, and the grooves extend across an entire row of indentations to accommodate a conductive layer.

Figure 7:
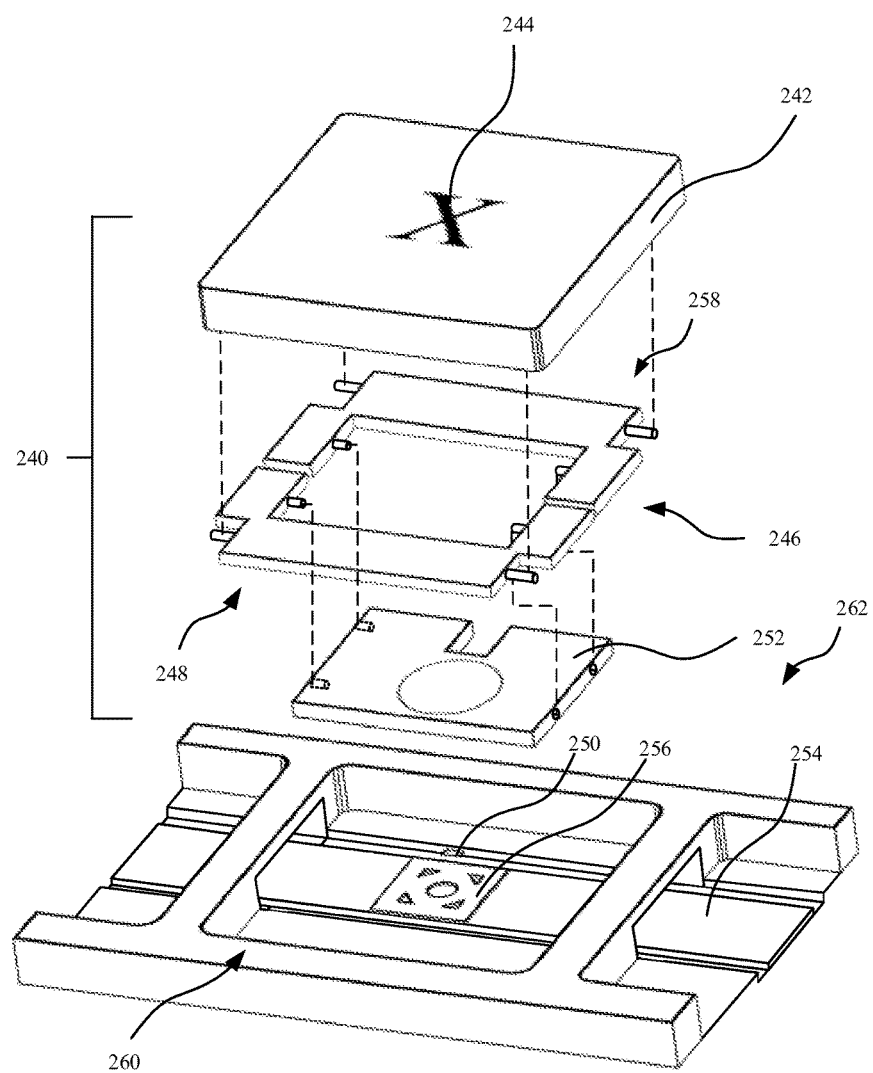
FIG. 7 illustrates an exploded view of an embodiment of a key assembly configured to be positioned into an indentation.

FIG. 7 illustrates an exploded view of an embodiment of key assembly 240, or simply key 240, configured to be positioned into indentation 260. For illustrative purposes, an enlarged portion of keyboard 262 is shown. Key 240 may include keycap 242 having symbol 244. Symbol 244 may be any character generally known to be positioned on a keycap of a keyboard. In some embodiments, symbol 244 includes transparent material through which light from light source 250 passes. In the embodiment shown in FIG. 7, symbol 244 is printed on keycap 242. Keycap 242 may be coupled to hinge mechanism 246 configured to bias in a direction toward keycap 242 (i.e., away from keyboard 262), and pivot about outer regions 248 and 258 when keycap 242 is depressed. Key assembly 240 may further include switch 252. In some embodiments, switch 252 is a mechanical switch configured to signal conductive layer 254 that keycap 242 is depressed. In the embodiment shown in FIG. 7, switch 252 is an electronic switch. Switch 252 may be electrically coupled to metal trace 256 of conductive layer 254 in order to electrically couple switch 252 with conductive layer 254. Although keycap 242 is shown having a substantially square shape, keycap 242 may be substantially rectangular. Accordingly, other components of key 240 (e.g., hinge mechanism 246) may include various dimensions to accommodate keycap 242 having a shape other than that shown in FIG. 7. For example, a space bar of a keyboard may include one dimension substantially greater than another dimension.

FIGS. 8 and 9 illustrate cross sectional views showing various embodiments of a keyboard. The electronic device may include openings or inlets configured to receive a conductive layer such that the conductive layer may be electrically connect a row of keys to an internal component of the electronic device.

FIG. 8 shows an embodiment of electronic device 300 having top case 302 engaged with bottom case 304, with internal component 306 enclosed between top case 302 and bottom case 304. Conductive layer 308, positioned on rear portion 310 associated with a keyboard contained by top case 302, electrically connects a row of keys 312 of the keyboard to internal component 306. Row of keys 312 further includes first opening 314 and second opening 316, both of which are generally located on lateral portions of top case 302 and further configured to receive conductive layer 308. In this manner, any contaminants falling in a direction toward electronic device 300 may not have a direct path to internal component 306. Only first opening 314 and second opening 316, both of which are already occupied by conductive layer 308, provide an area of ingress. Further, because conductive layer 308 is positioned between ribs 318 and rear portion 310, additional space may be available between rear portion 310 and internal component 306. This may be advantageous over traditional electronic devices with keyboards electrically connected to a unitary PCB located below rear portion 310.

FIG. 9 shows an alternate embodiment of electronic device 400 having top case 402 engaged with bottom case 404, with first internal component 406 electrically connected to keys 412 via conductive layer 408. Top case 402 includes opening 414 configured to receive conductive layer 408. A single opening, such as opening 414, may be useful to reduce the number of openings in top case 402. Further, this may be useful in instances when internal component 406 must be shielded from second component 416 by column 418, or alternatively, when column 418 is used to support rear portion 410. Also, although FIG. 8 shows opening 414 proximate to first key 420, in other embodiments, opening 414 is proximate to second key 422.

Also, in some embodiments, a conductive layer (e.g., conductive layer shown in FIGS. 8 and 9) may be replaced if damaged. For example, if a contaminant renders a key or keys in a row inoperable, the keys may be removed from the conductive layer and reattached to a replacement conductive layer. The conductive layer may include a connection device that is received by an internal component for easy connectivity. This may allow for an efficient rework operation as opposed to a unitary PCB which, if damaged, would require removal of all keys followed by installing a replacement PCB.

Although, the embodiments shown in FIGS. 8 and 9 include a rear portion that is generally flat or level, the rear portion may be bowed in a central region (e.g., an area above second component 416 in FIG. 9) such that gravity compels any contaminants in contact with the rear portion away from openings (e.g., opening 414 in FIG. 9). This may further prevent the contaminants from entering the opening or openings that receive the conductive layer.

Figure 10:
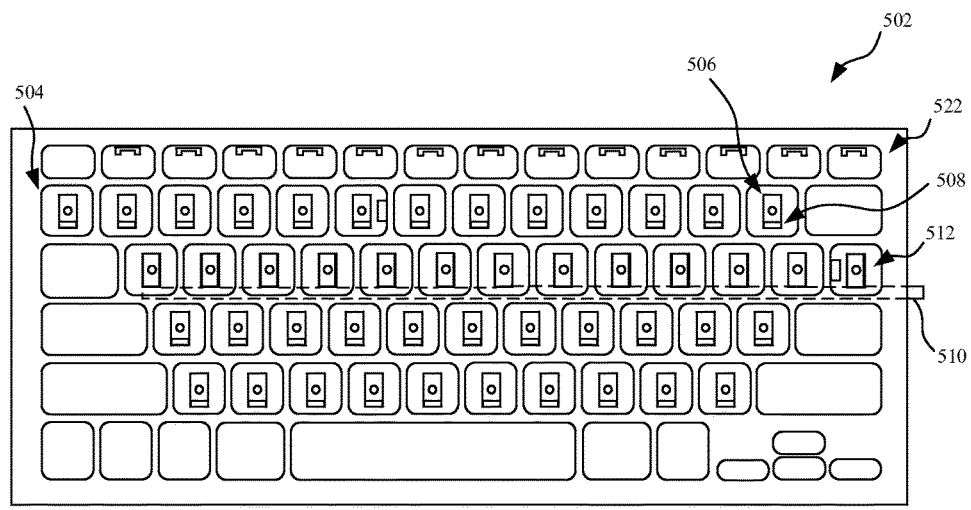
FIG. 10 illustrates a top view of an embodiment of a keyboard having apertures in the indentations, the apertures configured to receive extensions of a conductive layer.

Although previous embodiments describe the indentations for receiving the keys being free of openings on the rear portion, other embodiments may include indentations having openings through which portions of conductive layers may extend. For example, FIG. 10 illustrates top view keyboard 502 with indentations 504 configured to receive keys (not shown). Some indentations 504 include additional material removed to form grooves 506 having openings 508 configured to receive a portion of the conductive layers. An exemplary conductive layer 510 is shown having extensions 512 configured to pass through openings 508. Rather than being positioned below the indentations 504, a lengthwise portion of conductive layer 510 may generally be positioned between adjacent rows of indentations 510 with extensions 512 positioned within indentations 504. It will be appreciated that extensions 512 are made from similar materials as that of conductive layer 510 and are configured to electrically connect the keys to internal components in a similar manner previously described.

Figure 11:
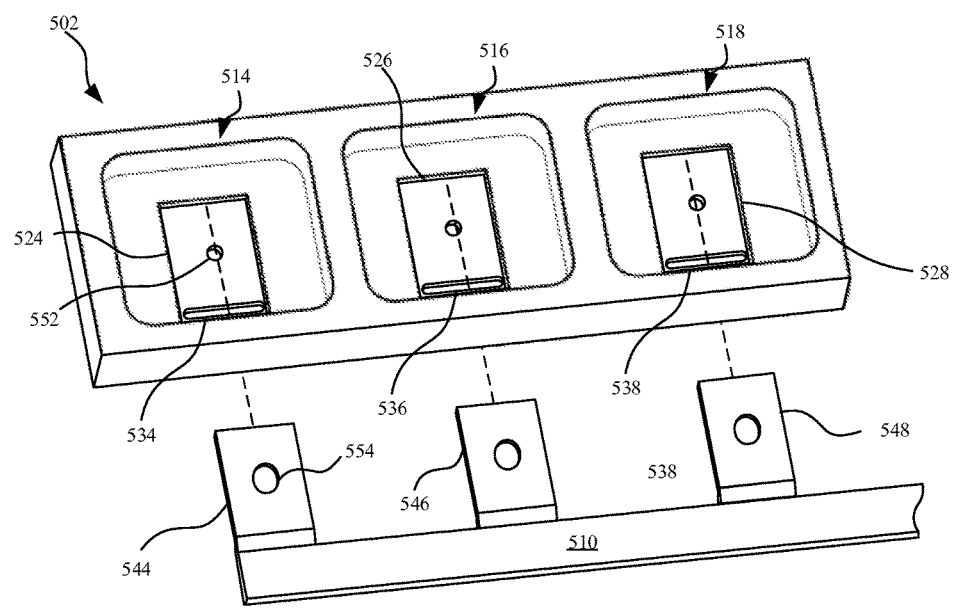
FIG. 11 illustrates an enlarged portion of the keyboard in FIG. 10, showing how the extensions are received by the indentations.

FIG. 11 illustrates an enlarged portion of keyboard 502 in FIG. 10, showing keyboard 502 with first indentation 514 having first groove 524, second indentation 516 having second groove 526, and third indentation 518 having third groove 528. In order to receive an extension of conductive layer 510, first groove 524 includes first opening 534, second groove 524 includes second opening 536, and third groove 528 includes third opening 538. Conductive layer 510 includes first extension 544, second extension 546, and third extension 548 that may be positioned into first groove 524, second groove 526, and third groove 528, respectively. In this manner, conductive layer 510 provides an electrical pathway for keys positioned in first indentation 514, second indentation 516, and third indentation 518. The extensions and the grooves may further include apertures in order to receive, for example, a light source or switch. For example, first groove 524 includes first aperture 552 configured to align with first aperture 554 of first extension 544. Also, conductive layer 510 may be electrically connected to an internal component in any manner previously described for a conductive layer. For example, keyboard 502 may include openings in lateral portion of keyboard allowing conductive layer 510 connect to an internal component.

Figure 12:
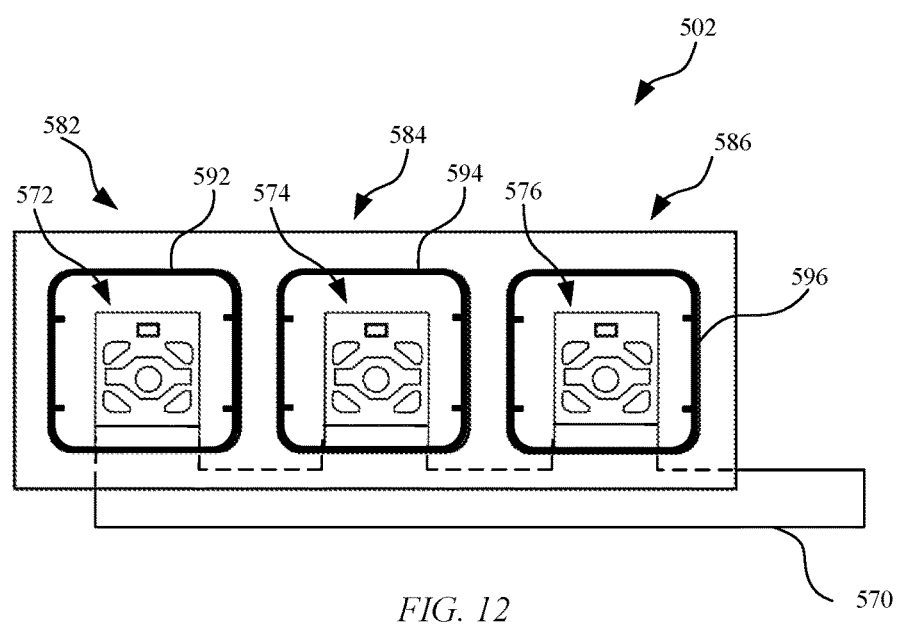
FIG. 12 illustrates an enlarged portion of the keyboard in FIG. 10, with an alternate embodiment of a conductive layer engaged with the keyboard.

FIG. 12 illustrates an enlarged portion of keyboard 502 in FIG. 10, with of an alternative embodiment of conductive layer 570 engaged within keyboard 502. Conductive layer 570 may include first metal trace 572, second metal trace 574, and third metal trace 576, all of which are configured to provide an electrical contact to keys positioned first indentation 582, second indentation 584, and third indentation 586, respectively. Further, in order to provide insulation from electromagnetic interference (EMI) and/or to provide insulation from adjacent keys, guards may be placed within the indentations. For example, first indentation 582, second indentation 584, and third indentation 586 include first guard 592, second guard 594, and third guard 596 positioned within first indentation 582, second indentation 584, and third indentation 586, respectively. Although the guards shown in FIG. 12 are substantially square, the guards could include any shape corresponding to an indentation such that the guards fit into the indentation and provide EMI insulation. Also, the guards may include a height similar to the height (or depth) of the indentation.

Figure 13:
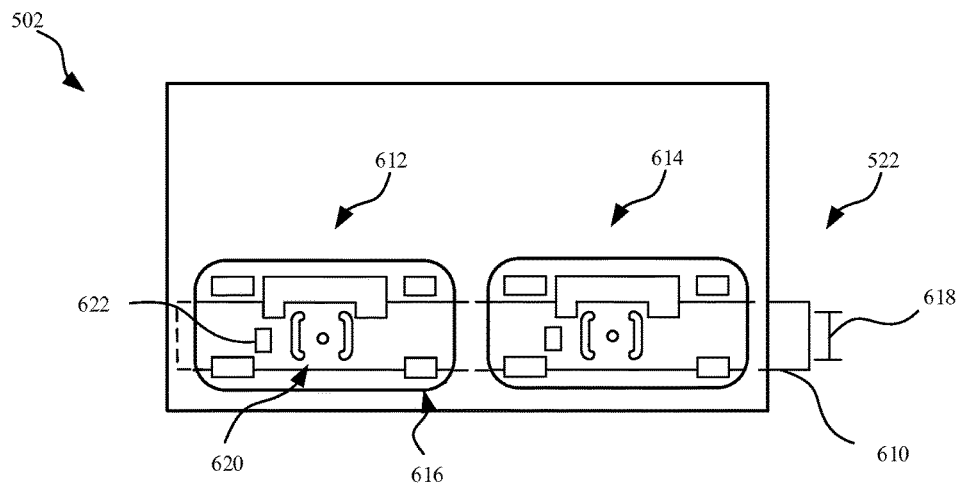
FIGS. 13 and 14 illustrate an enlarged portion of a keyboard showing embodiments of a conductive layer extending through a row of substantially rectangular keys (e.g., function key row)
Figure 14:
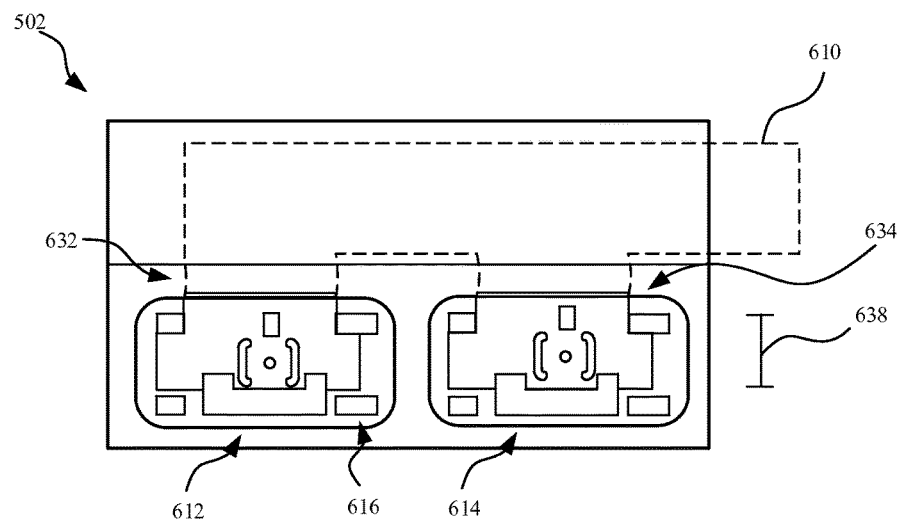

Referring again to FIG. 10, keyboard 502 may include an uppermost row 522 of indentations which receive a row of keys referred to as the "function key row" in traditional keyboards. For example, the function key row may include the "F1" and "F2" function buttons generally having a rectangular shape. The indentations associated with the function key row may include lesser dimensions that that of other indentations on keyboard 502. As a result, in some cases, the mechanical clearance within the indentations of corresponding to the function key rows reduces the overall usable area of the conductive layer within the indentation. For example, FIGS. 13 and 14 illustrate an enlarged portion uppermost row 522 of keyboard 502 (shown in FIG. 10). FIG. 13 illustrates an embodiment of conductive layer 610 extending through first indentation 612 and second indentation 614. In instances where first indentation 612 and second indentation 614 includes apertures 616, the useable area may of conductive layer 610 within first indentation 612 and second indentation 614 may be reduced. In this configuration, the width 618 associated with a useable area of conductive layer 610 may be as little has 1.5 to 2 mm. In other words, rather than having the entire width of conductive layer 610, metal trace 620 and light source 622, both within first indentation 612, are limited to the width 618 of conductive layer 610.

However, by using a conductive layer having extensions (functioning in a similar manner previously described) and by rotating the apertures within the indentations, the usable area of the conductive layer may increase. FIG. 14 shows conductive layer 630 located above upper most row 522 with a lengthwise portion of conductive layer 630 positioned below keyboard 502, with conductive layer 630 having first extension 632 and second extension 634 may extend into first indentation 612 and second indentation 614, respectively. This requires an additional cut similar to a conduit under a rib (see, for example, rib 136 and conduit 140, in FIG. 4) in order to feed first extension 632 and second extension 634 into the respective indentations. In this manner, first extension 632 and second extension 634 may include a usable width 638 greater than that of usable width 618 (in FIG. 13).

Figure 15:
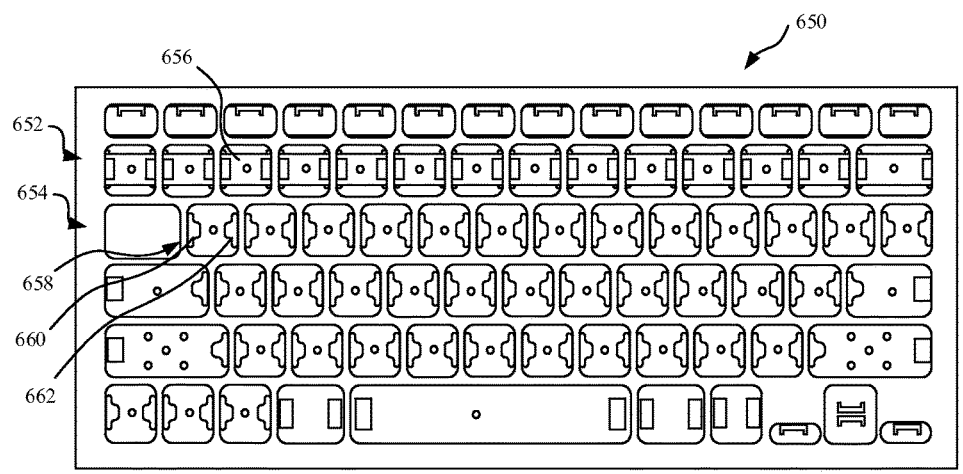
FIG. 15 illustrates a top view of an embodiment of a keyboard having indentations with apertures; conductive layers may extend through the indentations and the apertures in a weave pattern.

In some embodiments, a keyboard may include apertures not only to receive other components but to allow a conductive layer to extend through successive indentations in a row. For example, FIG. 15 illustrates another embodiment of a keyboard 650 having a different configuration for apertures within the indentations. For example, exemplary first row 652 and second row 654 include apertures configured to allow a conductive layer to pass through apertures in a weave pattern. For example, conductive layer 656 may pass through first row 652 in such a manner Second row 654 includes an exemplary indentation 658 having first aperture 660 and second aperture 662. These apertures may also be present in indentations of first row 652.

Figure 16:
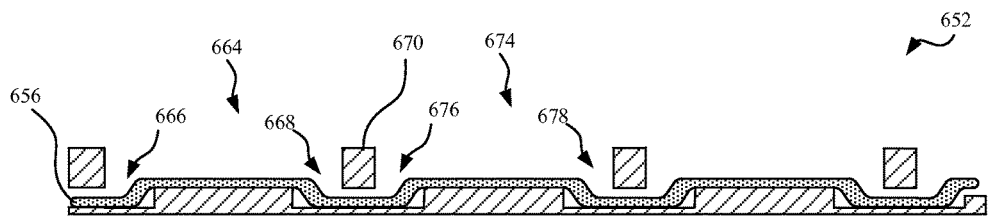
FIG. 16 illustrates a cross sectional side view of the embodiment shown in FIG. 15.

FIG. 16 illustrates an enlarged cross sectional portion of first row 652 in FIG. 15, showing conductive layer 656 weaving through the apertures of the indentations. For example, conductive layer 656 passes through first indentation 664 having first aperture 666 and second aperture 668, and further passes under first rib 670. Conductive layer 656 then extends into second indentation 674 having first aperture 676 and second aperture 678, and so on. Also, conductive layer 656 may be electrically connected to an internal component in any manner previously described for a conductive layer. For example, keyboard 650 may include openings in a lateral portion or portions allowing conductive layer 656 to connect to an internal component. It will be appreciated that FIG. 16 is for exemplary purposes, and some features may be exaggerated or non-proportional to show detail. For example, conductive layer 656 may include a thickness substantially smaller than that of rib 670.

Figure 17:
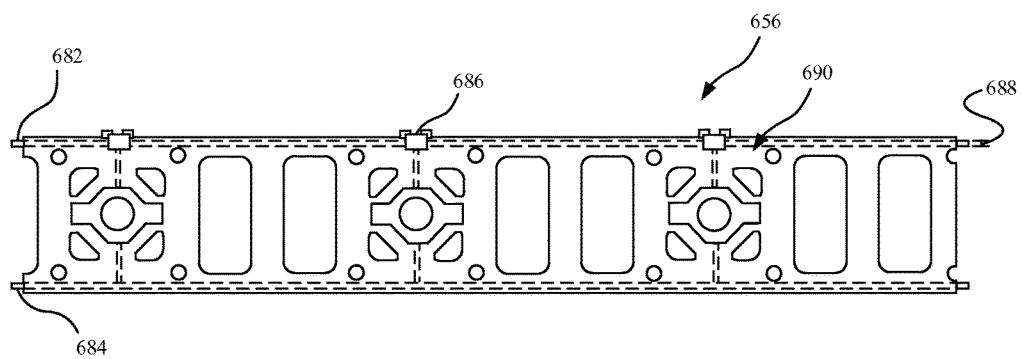
FIG. 17 illustrates an enlarged portion of an embodiment of a conductive layer shown in FIGS. 15 and 16.

FIG. 17 illustrates dimensional detail as well as internal characteristics of conductive layer 656 shown in FIG. 15. For example, conductive layer 656 may include first trace layer 682 and second trace layer 684, both which include an electrically conductive material or materials electrically shielded from, for example, the keyboard. First trace layer 682 and second trace layer 684 are configured to provide electrical current to an entire row of keys, for example, to power an LED and or/switch. Also, first trace layer 682 and second trace layer 684 may allow for an internal component to scan the row of keys in order determine whether any switch or switches associated with the row of keys are actuated. In other words, first trace layer 682 and second trace layer 684 allow an electronic device to determine whether a key has been depressed. The width of the trace layers allow conductive layer 656 to conforming to the size of the indentations in which the conductive layer 656 is positioned. For example, first trace layer includes width 688 approximately in the range of 0.7 to 1.1 mm. Also, first trace layer 682 and or second trace layer 684 may be electrically connected to a metal trace on conductive layer 656, such as metal trace 690.

Figure 18:
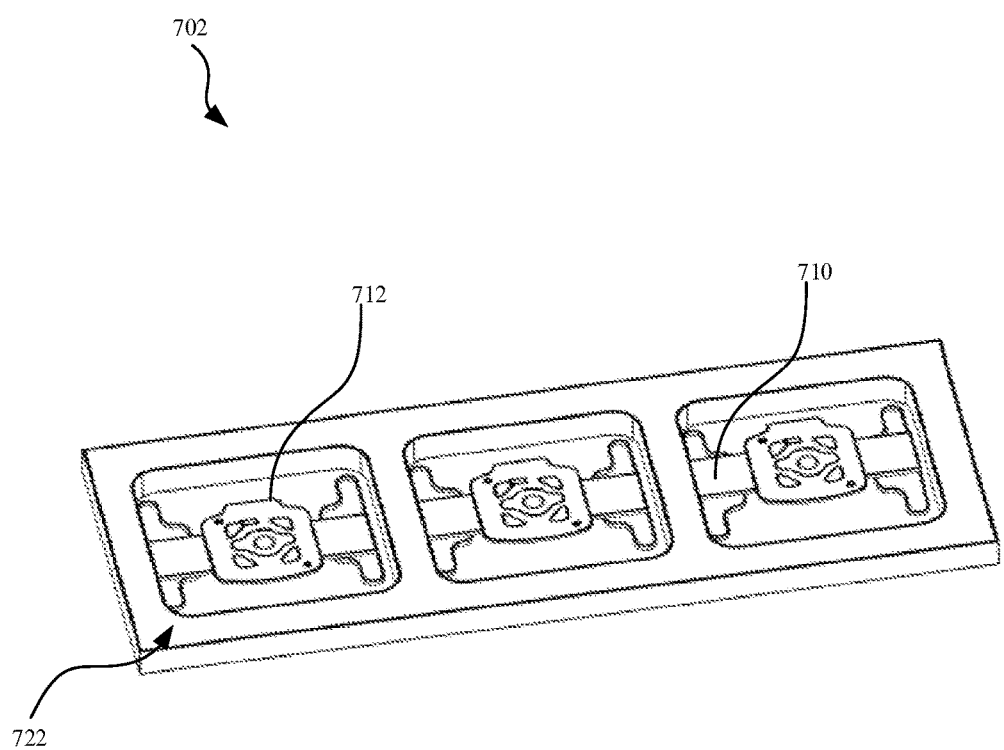
FIG. 18 illustrates an enlarged portion of an embodiment of a keyboard having a conductive layer weaving through indentations and apertures; the conductive layer further includes an insert.

FIG. 18 illustrates an enlarged portion of alternative embodiment of a keyboard 702 having conductive layer 710 positioned in a keyboard in a weave pattern. Further, conductive layer include inserts electrically connected to conductive layer 710. For example, first insert 712 serves as a substrate to receive components of a key assembly 240 (shown in FIG. 7). In some embodiments, first insert 712 is a PCB insert. In the embodiment shown in FIG. 18, first insert 712 is a metallic substrate (e.g., sheet metal) pre-molded to fit within first indentation 722. First insert 712 may be any metal capable of creating an electrically conductive path. First insert 712 may be configured to electrically connect to a light source (not shown) within first indentation 722 and/or switch (not shown) configured to be actuated by depressing a key positioned in first indentation 722. By using inserts, conductive layer 710 may be substantially insulated (electrically and mechanically) while having only minimal exposure in order to connect to the inserts. Also, conductive layer 710 may be used in rows having different dimensions. In this manner, only the inserts (e.g., first insert 712) vary within the indentations while conductive layer 710 remains the same.

Figure 19:
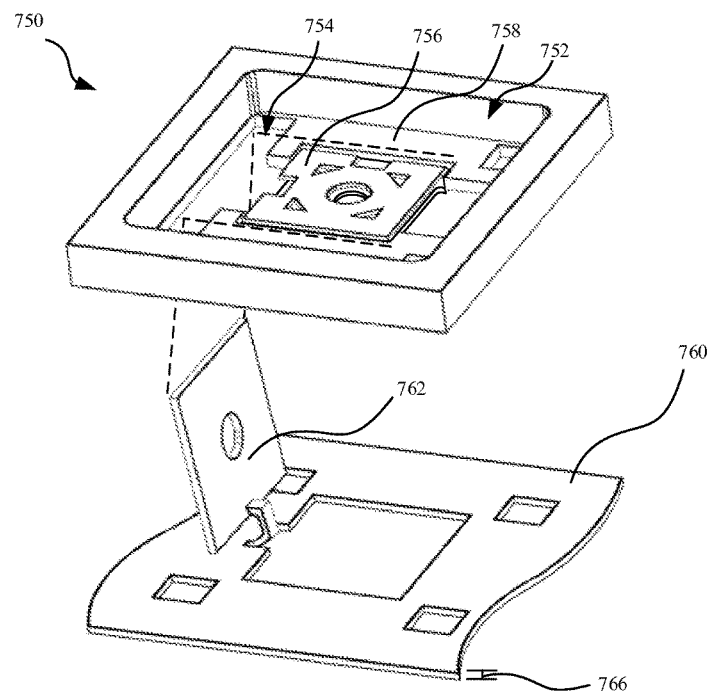
FIGS. 19 and 20 illustrate another embodiment of an enlarged portion of a keyboard having a conductive layer having a flap extending through an indentation via an aperture in the indentation.
Figure 20:
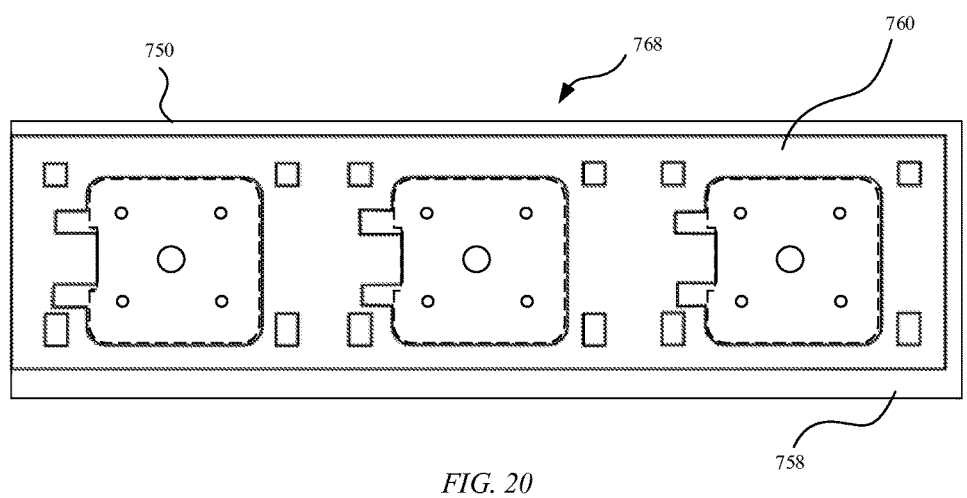

FIGS. 19 and 20 illustrate another embodiment of an enlarged portion of conductive layer 760 configured to electrically connect to a row of keys. For illustrative purposes, an enlarged portion of keyboard 750 is shown to illustrate the relationship between indentation 752 and conductive layer 760. Conductive layer 760 may include flap 762 cut from conductive layer 760. Flap 762 may be configured to pass through first aperture 754 of keyboard and rest over or metal trace 756 positioned in a groove of rear portion 758. In this manner, flap 762 may be electrically connected to metal trace 756 such that a key of keyboard 750 may be inserted into indentation 752 and be electrically connected to an internal component via flap 762 and conductive layer 760. Also, conductive layer 760 may include thickness 766 approximately in the range of 0.08 to 0.2 mm.

FIG. 20 illustrates a bottom view of keyboard 750 showing conductive layer 760 extending along a row of indentations 768 and connected to a metal trace (not shown). Although conductive layer 760 is positioned below rear portion 758, thickness 766 of conductive layer 760 is substantially less than that of a traditional PCB.

Figure 21:
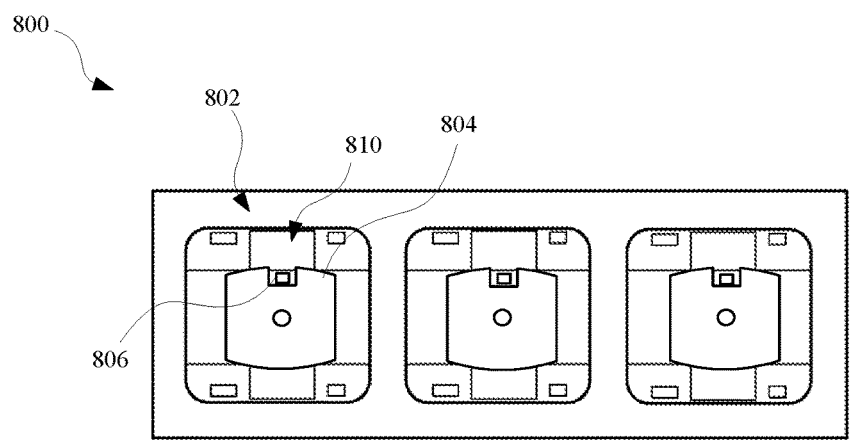
FIG. 21 illustrates an embodiment of an enlarged portion of a keyboard having a component and a light source positioned within the indentations.
Figure 22:
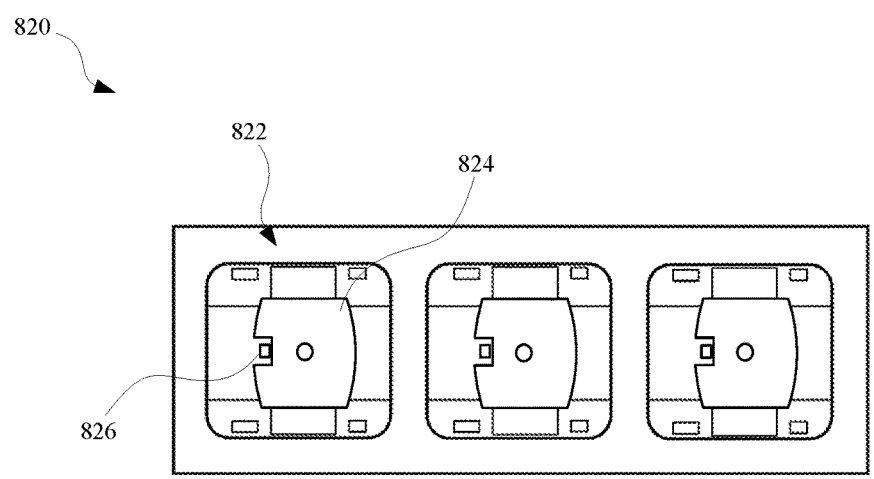
FIG. 22 illustrates an alternate embodiment of an enlarged portion of a keyboard with the components and light sources rotated 90 degrees counterclockwise.

FIGS. 21 and 22 illustrate a top view of enlarged portions of keyboards having components within indentation oriented in different manners. FIG. 21 shows keyboard 800 having components and switches in "12 o'clock" orientation. For example, first indentation 802 includes first component 804 and first switch 806 proximate to uppermost portion 810 of first indentation 802. However, similar components and switches to those shown in FIG. 21 may be rotated in order to reduce the thickness of the indentations of the keyboard. In FIG. 22, keyboard 820 shows keyboard 820 having components and switches in "9 o'clock" orientation. For example, first indentation 822 includes first component 824 and first switch 826 rotated approximately 90 degrees counterclockwise with respect to first component 804 and first switch 806 (both shown in FIG. 21). By reducing the thickness in the indentations of the keyboard, particularly near the ends of the rows of keys, additional thickness may be added to the keyboard in other portions (e.g., a rear portion). As a result, additional components may be integrated with the keyboard thereby creating more efficient use of space within an electronic device. This will be discussed in detail below.

Figure 23:
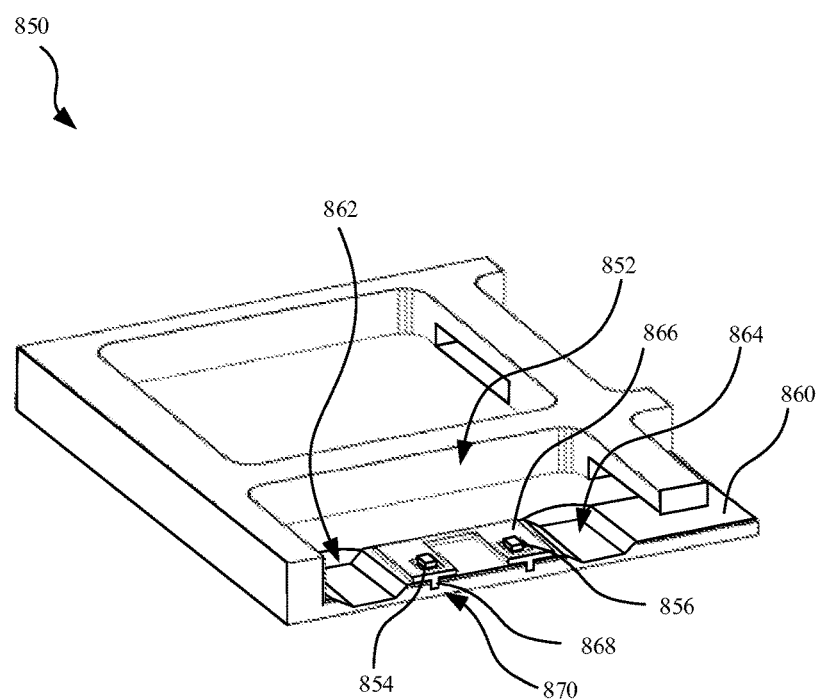
FIG. 23 illustrates an isometric view of an embodiment of a keyboard having a rectangular indentation, the rectangular indentation having grooves which reduce they thickness of a rear portion of the keyboard.

While some keys assemblies (e.g., substantially square keys) may include components rotated in a manner previously described, rotation of other key assemblies may not be possible. However, thickness reduction of the keyboard may still be achieved. FIG. 23 illustrates an isometric view of an enlarged portion of keyboard 850 with indentation 852 having a substantially rectangular in shape, and further having first light source 854 and second light source 856. In this embodiment, indentation 852 is near a key in the uppermost row of keyboard 850, similar uppermost row 522 in FIG. 10. However, in other embodiments, indentation 852 is located at the end of a different row of keys, such as "Tab" key or "Return" key, or another key in a traditional keyboard known to be substantially rectangular.

Due to the limited available space of conductive layer 860 coupled with first light source 854 and second light source 856, a rotation of components (not shown) and lights sources is not feasible. For example, housing 866 used to receive a switch (not shown) may include a shape that does not allow for rotation. In order to reduce thickness (or depth) of indentation 852, indentation 852 may include grooves within indentation 852. For example, indentation 852 includes first groove 862 and second groove 864 associated with material removed from indentation 852. In other embodiments, indentation includes a single groove. First groove 862 and second groove 864 may be machined or cut, or formed in another manner within indentation 852. Also, as shown in FIG. 23, conductive layer 860 is sufficiently flexible to be positioned within first groove 862 and second groove 864. Also, housing 866 may include a boss, such as first boss 868, positioned within opening 870 of first indentation 852. In some embodiments, a heat staking process is used to deform (via heat) the bosses to attach to keyboard 850. For example, first boss 868 has undergone a heat staking process to the shape of opening 870. This allows housing 866 to be secured within indentation 852 in an area not occupied by first groove 862 and second groove 864.

Figure 24:
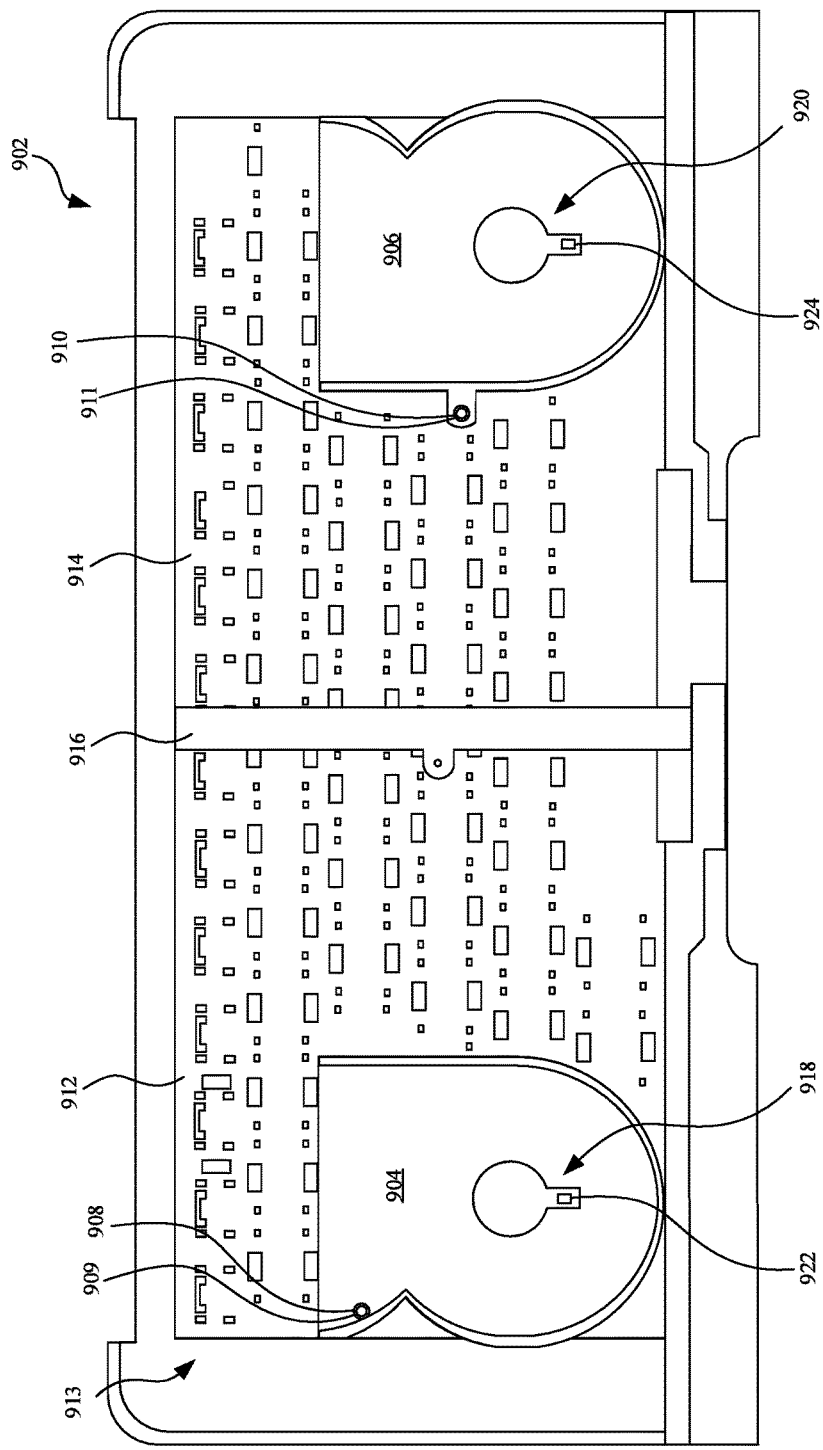
FIGS. 24 and 25 illustrate an isometric view of a top case rotated to show in an internal portion of the top case having substrates configured to receive internal components of an electronic device.
Figure 25:
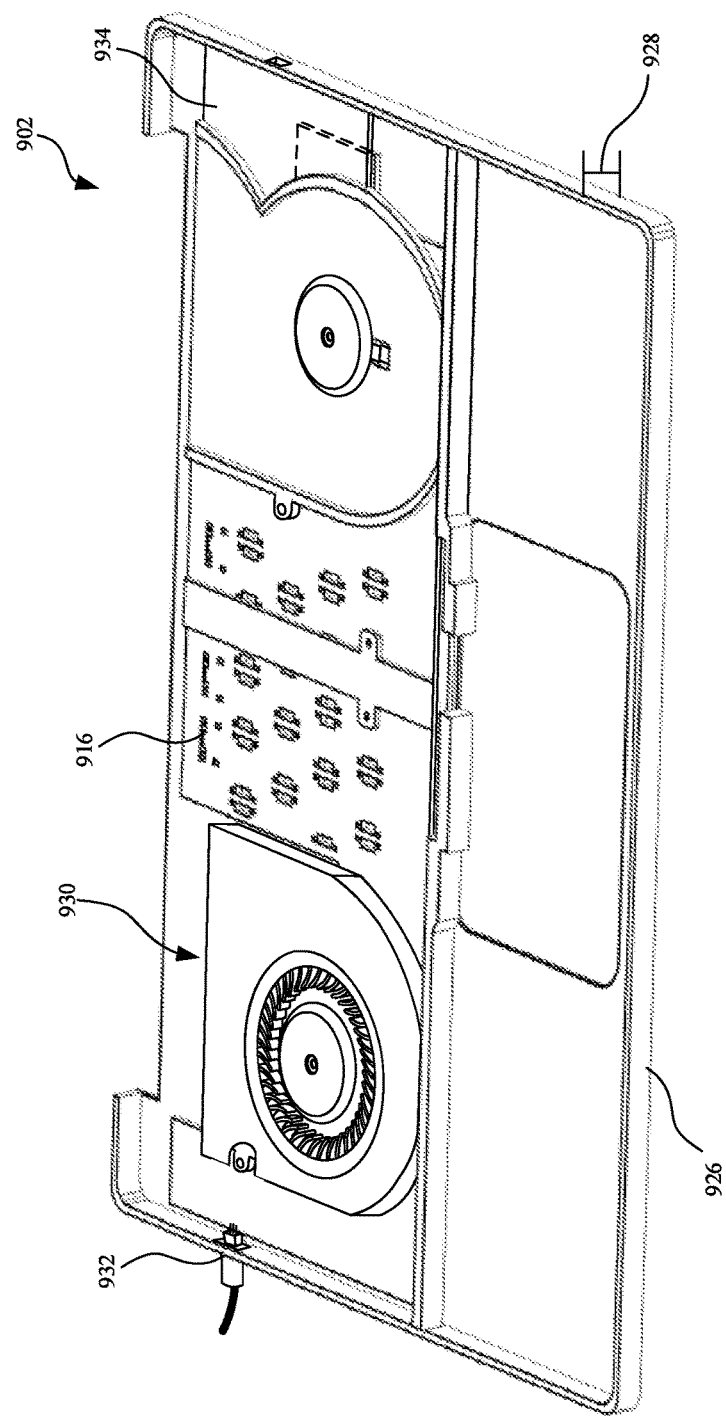

A keyboard using the methods for reducing thickness of an exterior portion of a keyboard (described in FIGS. 21-23) may integrate additional components by increasing thickness of corresponding interior portions inside the keyboard. For example, FIGS. 24 and 25 illustrate a bottom view of keyboard 902 showing an internal portion of keyboard 902 having first substrate 904 and second substrate 906. In some embodiments, first substrate 904 and second substrate 906 are made from a plastic material. In the embodiment shown in FIG. 24, first substrate 904 and second substrate 906 are made from a material similar to that of keyboard 902 (e.g., aluminum). The interior portion of keyboard 902 may undergo a material removal process such that protrusions (e.g., bosses) remain. For example, first protrusion 909 and second protrusion 911 may be configured to receive a fastener (e.g., screw, rivet) through first opening 908 and second opening 910 of first substrate 904 and second substrate 906, respectively. This allows for simplified integration of the substrates 904 and 906 with keyboard 902.

Also, in some embodiments, a rear portion of keyboard 902 is machined in a manner previously described such that conductive layers may pass through several ribs. In other embodiments, several rows of conductive layers may weave between ribs and a rear portion of keyboard 902. In the embodiment shown in FIG. 24, keyboard 902 includes first input-output ("I/O") board 912 and second I/O board 914 secured between first substrate 904, second substrate 906, a rear portion 913 of keyboard 902, and further fastened by plate 916. In some embodiments, first I/O board 912 and second I/O board 914 are made from metal. In other embodiments, first I/O board 912 and second I/O board 914 are made from PCB. In the embodiment shown in FIG. 25, first I/O board 912 and second I/O board 914 are made from a metal clad printed circuit board (MPCB). Also, in other embodiments, a single board may be used. First substrate 904 and second substrate 906 may further include first opening 918 and second opening 920, respectively. First opening 918 and second opening 920 are configured to be positioned over first connection 922 and second connection 924. First connection 922 and second connection 924 are electrically connected to first I/O board 912 and second I/O board 914, respectively. In this manner, a component positioned on first substrate 904 and/or second substrate 906 may be electrically connected to first I/O board 912 and/or second I/O board 914, respectively.

FIG. 25 illustrates an isometric view of the internal portion of keyboard 902 having a fan assembly 930 positioned on first substrate 904. Fan assembly 930 may electrically connected to first I/O board 912 via first connector 922 (shown in FIG. 24). In some embodiments, fan assembly 930 is configured to drive air in a direction toward internal components to cool the internal components. In some embodiments, fan assembly 930 is configured to drive air in a direction toward first substrate 904 to cool first substrate 904 and further cool first I/O board 912. Second substrate 906 is generally capable of receiving any component that first substrate 904 is capable of receiving. Also, although first substrate 904 and second substrate 906 include a unique shape, as shown in FIG. 25, first substrate 904 and second substrate 906 may take on additional shapes or configurations in order to receive a desired component. First I/O board 912 may be configured to receive connector 932, which may be part of a cable assembly that electrically connects an external device (not shown) to first I/O board 912. Also, second I/O board 914 is capable of electrically connecting to connector 932 via substrate 934. An electronic device having a keyboard region with integrated components may create additional space for the electronic device to, for example, include additional components to create an electronic device with greater capabilities. Alternatively, lip portion 926 may include a reduce lip height 928 to form a more compact electronic device.

Figure 26:
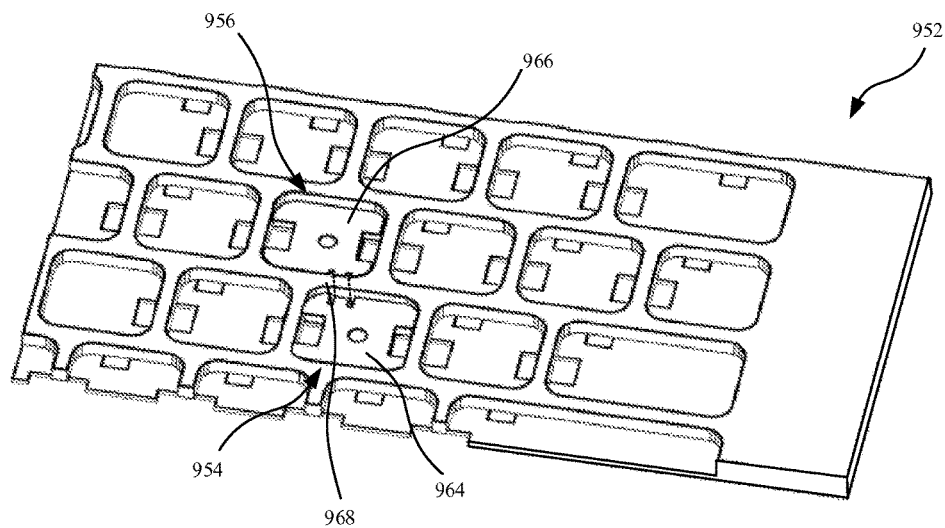
FIG. 26 illustrates an embodiment of a portion of a keyboard having individual, or modular, conductive layers.

Some embodiments do not require a conductive layer to electrically connect keys in a row, while still also not requiring a traditional PCB positioned below a bottom portion of the keyboard. In these embodiments, each indentation may include a modular layer configured to electrically connect individual keys to an internal component of an electronic device. These modular layers include extensions that may be mechanically and electrically connect to other modular layers. For example, FIG. 26 illustrates in isometric top view of a portion of keyboard 952 including first indentation 954 and second indentation 956 having layer 964 and second layer 966, respectively. In some embodiments, first layer 964 and second layer 966 are formed from PCB material. In the embodiment shown in FIG. 26, first layer 964 and second layer 966 are generally flexible layers configured to be positioned on a bottom portion of first indentation 954 and second indentation 966, respectively. Also, first layer 964 and/or second layer 966 may be configured to connect with other adjacent modular layers positioned in other indentations. For example, first layer 964 is connected to second layer 966 below rib 968 positioned between first indentation 954 and second indentation 956. Ultimately, at least one of the layers electrically connects to an internal component (not shown) thereby providing both electrical current to the keys as well as provides a pathway for an internal component to scan the various keys to determine whether a switch or switches (not shown) have been depressed within the indentations. Also, first layer 964 and second layer 966 may each receive a light source (e.g., LED) configured to provide light within first indentation 954 and second indentation 956, respectively. Also, first layer 964 and 966 may be configured to electrically connect a switch configured to be actuated when a key (not shown) is depressed. It should be noted that while first layer 964 and second layer 966 provide an electrical path for keys associated with the first layer 964 and second layer 966, first layer 964 and second layer 964 are otherwise electrically shielded from keyboard 952 to prevent electric shock to a user.

Figure 27:
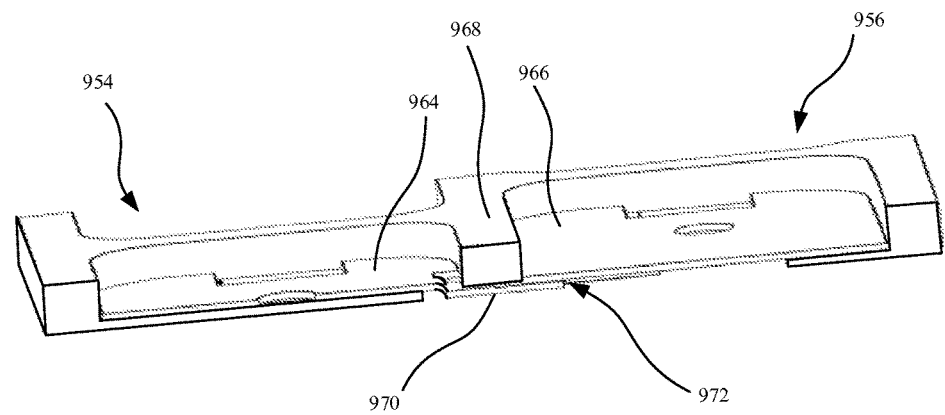
FIG. 27 illustrates an enlarged portion of the keyboard in FIG. 26, showing two modular conductive layers in different rows of keys electrically connected to each other.

FIG. 27 illustrates an exemplary connection between first layer 964 and second layer 966. In this embodiment, first layer 964 includes extension 970 configured to extend below rib 968. An interface region 972 on second layer 966 is configured to receive extension 970. Extension 970 may be soldered, welded, or otherwise electrically connected to interface region 972. Also, in the embodiment shown in FIGS. 26 and 27, first layer 964 and second layer 966 are not positioned in the same row. However, in other embodiments, first layer 964 and second layer 966 are positioned in the same row, and further include similar connection means to each other as previously described. By using modular layers as described, individual keys and/or modular layers may be individually replaced or repaired without alteration to other keys and/or modular layers. In this manner, the cost of repair may be significantly reduced as a result of time and materials savings.

Figure 28:
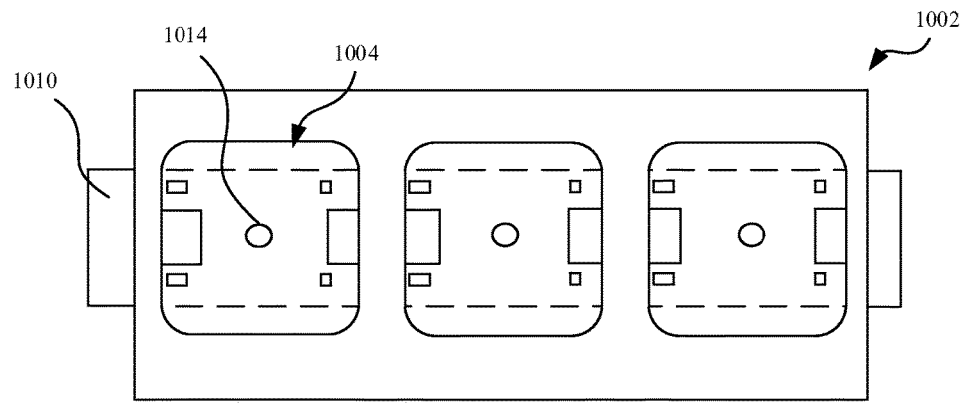
FIG. 28 illustrates a top view of an enlarged portion of a keyboard having a conductive layer below a rear portion of the keyboard, i.e., not within the indentations of the keyboard.
Figure 29:
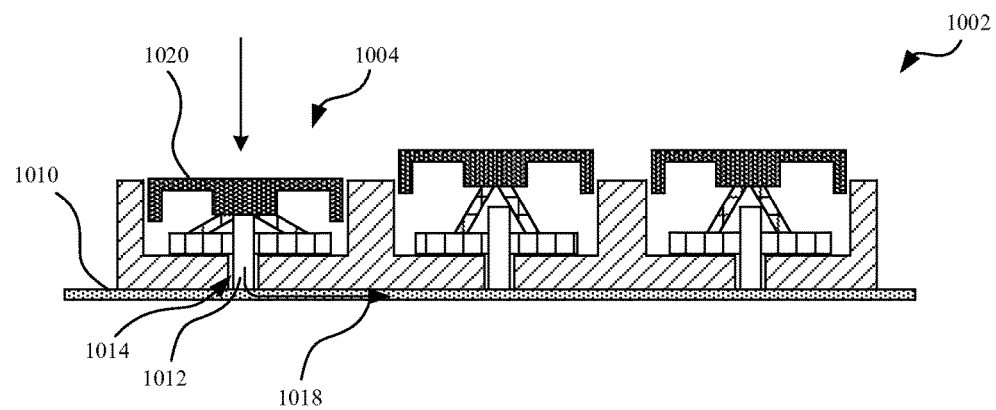
FIG. 29 illustrates a cross sectional side view of an embodiments of the conductive layer in FIG. 28, with a conductive pin positioned in an aperture of the keyboard.
Figure 30:
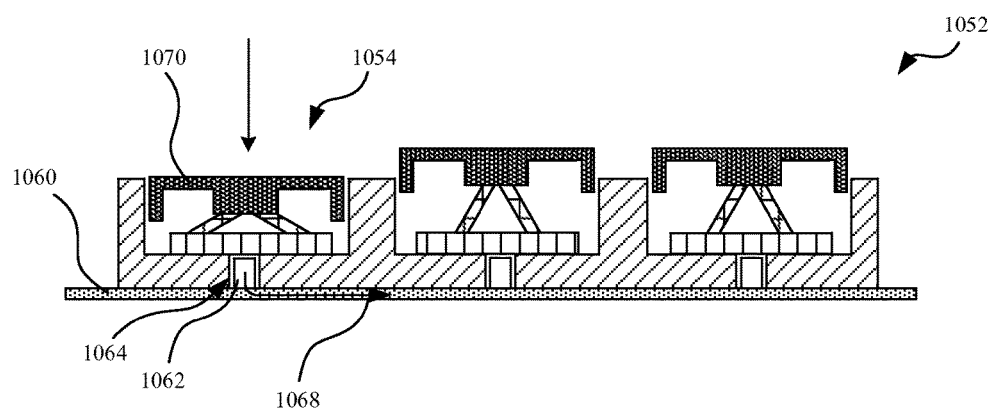
FIG. 30 illustrates a cross sectional side view of an embodiments of the conductive layer in FIG. 28, with the conductive pin replaced with a sensor.

FIGS. 28-30 illustrate an embodiment of a keyboard having a conductive layer positioned below a rear portion of the keyboard. In order to reduce the overall space occupied by the conductive layer, in some embodiments, the conductive layer may include an EMI shield merged with the conductive layer. FIG. 28 shows a top view of an enlarged portion of keyboard 1002 having conductive layer 1010 extending along a row of indentations. Also, keyboard 1002 may include indentations having apertures (e.g., first aperture 1014 in first indentation 1004). In order to indicate to an internal component of an electronic device that a key is depressed, conductive layer 1010 may include conductive pins passing through the apertures. Conductive pins may be configured to receive and transmit a signal to conductive layer 1010 which may be electrically connected to the internal component. The signal may include an electrical signal or a data signal that one of the conductive pins is actuated. FIG. 29 shows a cross sectional side view of first indentation 1004 includes first conductive pin 1012 passing through first aperture 1014. First conductive pin 1012 is configured to send signal 1018 to conductive layer 1010 when first keycap 1020 is depressed.

Alternatively, a keyboard may include sensors configured to send a signal to a conductive layer. FIG. 30 shows a cross sectional side view of keyboard 1052 engaged with conductive layer 1060 having sensors positioned in the indentations. In some embodiments, the sensor is a capacitive sensor configured to send a signal to the conductive layer when the capacitive sensor senses a change in capacitance near a sensing region of the capacitive sensor. As shown, first indentation 1054 includes first sensor 1062 passing partially through first aperture 1064. First sensor 1062 is configured to change a state (e.g., provide a switching signal 1068) to conductive layer 1060 when first keycap 1070 is depressed even if first sensor 1062 is not contacted by first keycap 1070. In this manner, the sensors may provide the switching signal without any contact to the sensor. This offers less wear on the keyboard thereby decreasing the probability of breaking. Also, although the sensors are generally located in a central portion of the indentations, the sensors could be located in other regions of the indentations with corresponding apertures in similar regions.

Figure 31:
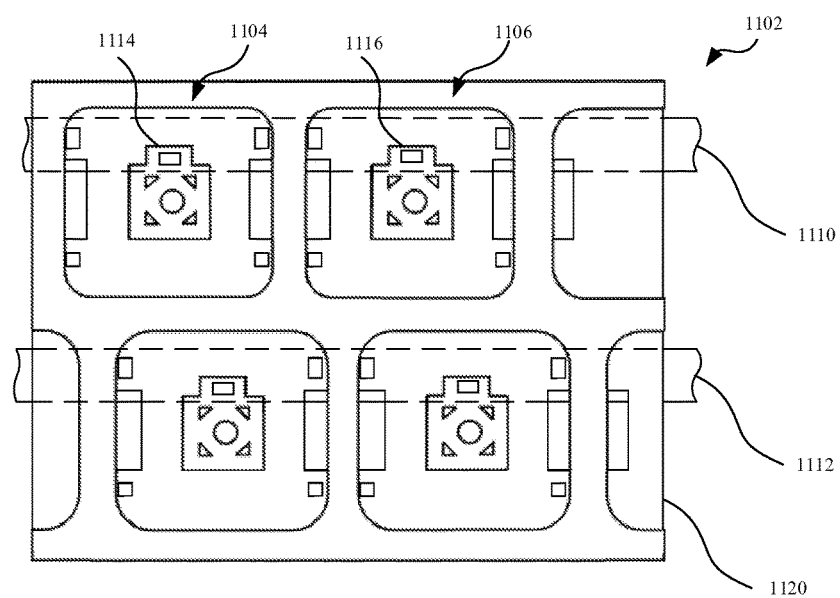
FIG. 31 illustrates an enlarged portion of an embodiment of a keyboard having inserts positioned in grooves of apertures, the inserts electrically connected to a conductive layer positioned below a rear portion of the keyboard.
Figure 32:
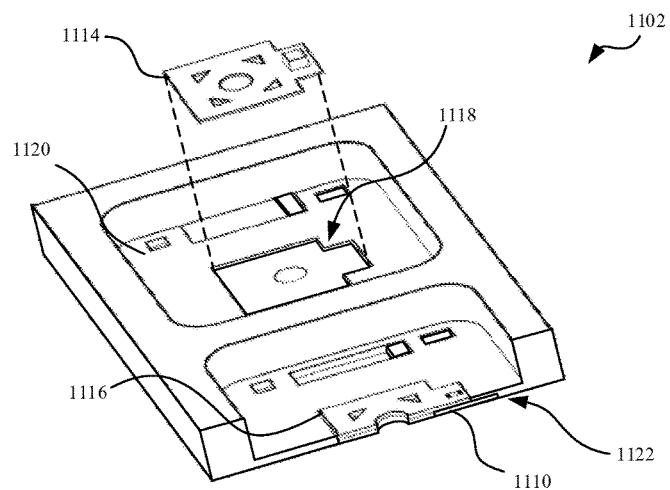
FIG. 32 illustrates an isometric view of the embodiment shown in FIG. 31, further showing a groove in an aperture and the insert electrically connected to the conductive layer.

Other embodiments having a conductive layer below the rear portion of the keyboard may be electrically connected to inserts positioned on the rear portion opposite the conductive layers. For example, FIGS. 31-32 illustrate an embodiment of an enlarged portion of keyboard 1102 having first conductive layer 1110 and second conductive layer 1112 positioned below rear portion 1120 of keyboard 1102. In some embodiments, conductive layer 1110 is a flexible layer previously described. In the embodiments shown in FIGS. 31-32, conductive layer 1110 is formed from PCB material. The conductive layers may electrically connect to inserts positioned on rear portion 1120 opposite the conductive layers. FIG. 31 illustrates conductive layer 1110 electrically connected to first insert 1114 and second insert 1116 positioned in first indentation 1104 and second indentation 1106, respectively. First insert 1114 and second insert 1116 may perform any of several functions previously described, such as electrically connecting keys (located on the inserts) to internal components of an electronic device or electrically connecting to a switch.

FIG. 32 shows an isometric view of an enlarged portion of keyboard 1102 in FIG. 31, further illustrating first conductive layer 1110 on an opposite portion of rear portion 1120 as compared with first insert 1114 and second insert 1116. Keyboard 1102 may include grooves configured to receive the inserts. For example, first groove 1118 is configured to receive first insert 1114. First groove 1118 may be any shape corresponding to the shape of first insert 1114. Also, in order to create sufficient space for a key assembly, first groove 1118 may have a depth similar to that of a thickness of first insert 1114 so that first insert 1114 is substantially co-planar, or flush, with rear portion 1120. FIG. 32 also shows a partial portion of second insert 1116 to show second insert 1116 electrically and mechanically connected to first conductive layer 1110. Second insert 1116 may be electrically connected to first conductive layer 1110 by, for example, welding, soldering, or conductive adhesive. Also, in order to mechanically connect with second insert 1116, material from rear portion 1120 may be removed (e.g., machining or cutting) to form first groove 1122. First groove 1122 may generally have corresponding dimensions as that of first conductive layer 1110 such that first conductive layer 1110 is substantially co-planar with rear portion 1120. In this manner, first conductive layer 1110 is positioned below rear portion 1120 but does not intrude on any internal space of the electronic device. It should be noted that first insert 1114, when positioned in first groove 1118, may be electrically and mechanically connected to first conductive layer 1110 in any manner similar to second insert 1116

Figure 33:
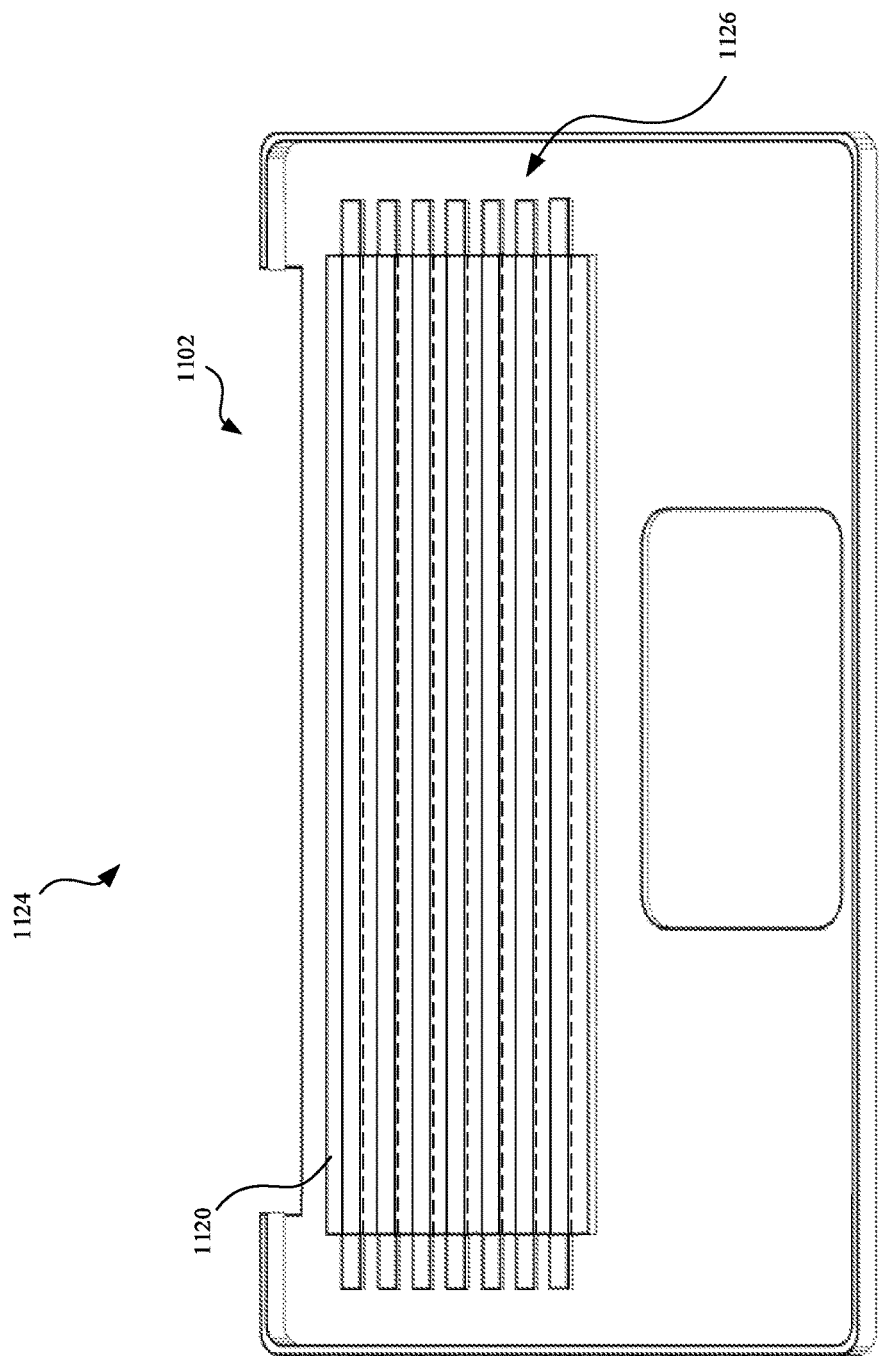
FIG. 33 illustrates an interior portion of a top case in accordance with the embodiment shown in FIGS. 31 and 32.

FIG. 33 illustrates an isometric view showing an internal portion of top case 1124 having keyboard 1102 shown in FIGS. 31 and 32. Conductive layers 1126 are shown positioned in grooves of rear portion 1120. For purposes of illustration, conductive layers 1126 are shown having a length such that conductive layers 1126 extend only through rear portion 1120. However, conductive layers 1126 may have a greater length in order to extend to and electrically connect to an internal component. Also, conductive layers 1126 may connect to internal components in any manner previously described for connecting a conductive layer to an internal component.

Figure 34:
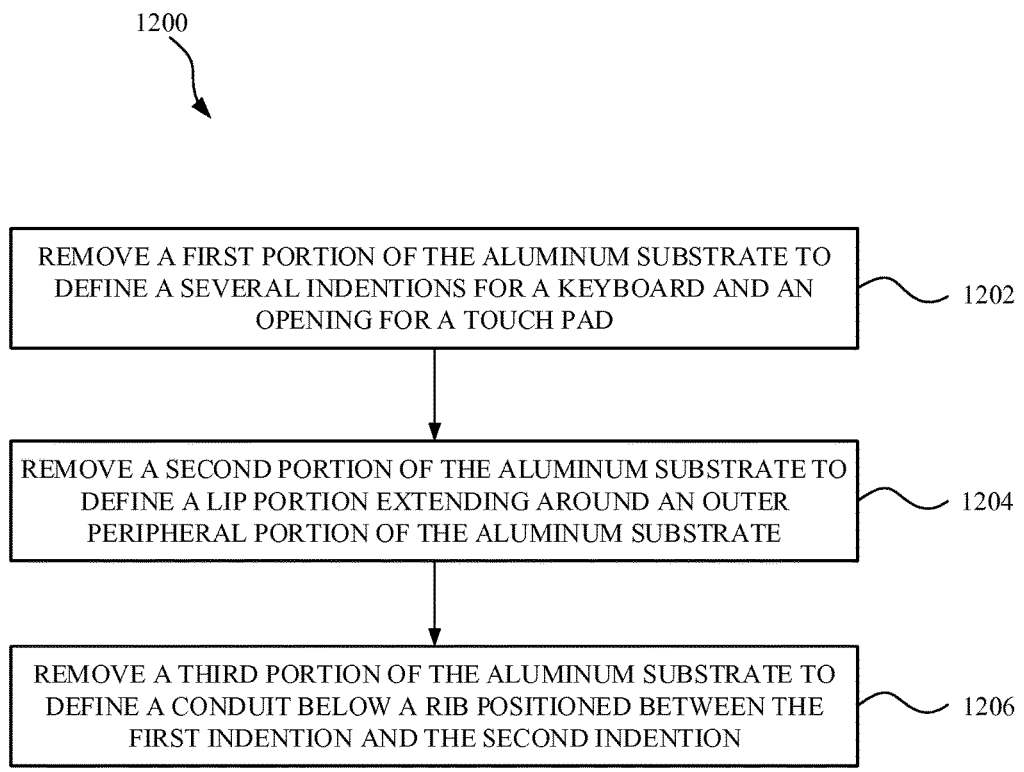
FIG. 34 illustrates a flowchart showing a method for forming a top case of an electronic device, the top case formed from an aluminum substrate.

FIG. 34 illustrates a flowchart 1200 showing a method for forming a top case of an electronic device, the top case formed from an aluminum substrate. In step 1202, a first portion of the aluminum substrate is removed to define several indentations for a keyboard and an opening for a touch pad. In some embodiments, the several indentations include a first row of indentations having a first indentation and a second indentation. Generally, the indentations include a shape and size to receive keys for a keyboard. In some embodiments, the indentations are configured in rows. Also, in some embodiments, the indentations include square as well as rectangular shapes. Also, in some embodiments, the indentations (or the rear portion defining a surface of the indentations) do not include any apertures. In other embodiments, the indentations include an aperture. The aperture may allow a conductive layer previously described to extend through the aperture. Alternatively, the aperture may allow a switch (e.g., conductive pin) to pass through the aperture and extend into the indentation. In step 1204, a second portion of the aluminum substrate is removed to define a lip portion extending around an outer peripheral portion of the aluminum substrate. In some embodiments, the second portion further defines part of a rear portion. Also, in some embodiments, material is removed in a manner such that a protrusion or protrusions are formed. The protrusions may be configured to receive a fastener that holds a substrate in place. In step 1206, a third portion of the aluminum substrate is removed define a conduit below a rib positioned between the first indentation and the second indentation. In some embodiments, the aluminum substrate includes several ribs having several conduits, thereby allowing a conductive layer previously described to extend through the indentations as well as the conduits.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A keyboard for an electronic device, the keyboard comprising:
    a single-piece substrate having a first surface and a second surface different from the first surface, the single-piece substrate comprising:
        a first indentation that carries a first key,
        a second indentation that carries a second key, the first indentation and the second indentation extending from the first surface to the second surface,
        a third surface that partially defines the second indentation, the third surface perpendicular to the first surface and the second surface, the third surface having an opening, and
        a rib positioned between the first indentation and the second indentation, the rib including a conduit; and
    an electrically conductive layer engaging the second surface and passing through the first indentation, the second indentation, and the conduit and electrically connecting to the first key and the second key, wherein the opening receives the electrically conductive layer.

2. The keyboard as recited in claim 1, wherein the first indentation and the second indentation are free of apertures that extend through the single-piece substrate.

3. The keyboard as recited in claim 1, wherein the conduit is confined between the rib and the second surface.

4. The keyboard as recited in claim 1, wherein the opening allows the electrically conductive layer to pass out of the second indentation and electrically couple to an internal component of the electronic device.

5. The keyboard as recited in claim 1, wherein the first indentation comprises a light source, and wherein the electrically conductive layer comprises a metal trace that electrically connects to the light source.

6. The keyboard as recited in claim 1, further comprising a groove extending along the first indentation, the second indentation, and the conduit, the groove having a dimension such that the conductive layer is co-planar with the second surface.

7. The keyboard as recited in claim 1, wherein the single-piece substrate is formed from a metal.

8. The keyboard as recited in claim 1, wherein the first indentation comprises an aperture, and wherein the electrically conductive layer comprises a flap extending through the aperture.

9. The keyboard as recited in claim 1, wherein the electrically conductive layer comprises a conductive pin disposed in the first indentation, and wherein the conductive pin provides an indication to the electrically conductive layer when the first key is depressed.

10. The keyboard as recited in claim 1, wherein the first indentation comprises:
a hinge mechanism coupled with the first key;
a switch coupled with the electrically conductive layer and the hinge mechanism.

11. A keyboard comprising:
a substrate having a row of indentations formed in the substrate, the row of indentations carrying a row of keys;
a planar surface integrally formed with the substrate and covered by the row of keys, wherein the row of indentations terminate at the planar surface; and
an electrically conductive layer defining a unitary layer that is carried by the planar surface and extending through the row of indentations, wherein the unitary layer electrically couples to each key of the row of keys.

12. The keyboard of claim 11, wherein the row of indentations are formed partially through the substrate, and wherein the substrate is formed from a metal.

13. The keyboard of claim 11, further comprising an opening through the substrate, wherein the electrically conductive layer passes through the opening.

14. The keyboard of claim 11, wherein the row of indentations comprises an indentation, the indentation comprising:
a first surface that receives the electrically conductive layer; and
a second surface perpendicular to the first surface, the second surface comprising an opening that receives the electrically conductive layer.

15. A keyboard comprising:
a substrate that lacks any apertures, the substrate having a first indentation that carries a first key and a second indentation that carries a second key;
a planar surface integrally formed with the substrate, wherein the first indentation and the second indentation terminate at the planar surface; and
an electrically conductive layer extending along the first indentation and the second indentation, the electrically conductive layer electrically coupled to the first key and the second key.

16. The keyboard claim 15, further comprising a grooved region that passes along the first indentation and the second indentation and receives the electrically conductive layer.

17. The keyboard of claim 15, further comprising:
a switched carried by the electrically conductive layer and located in the first indentation indentation;
a light source carried by the electrically conductive layer and located in the first indentation to illuminate the first key.

18. The keyboard claim 15, wherein the planar surface lacks any apertures.

* * * * *